US009086536B2

(12) United States Patent
Pang et al.

(10) Patent No.: US 9,086,536 B2
(45) Date of Patent: Jul. 21, 2015

(54) TALBOT IMAGING DEVICES AND SYSTEMS

(75) Inventors: Shuo Pang, Pasadena, CA (US);
Changhuei Yang, Pasadena, CA (US)

(73) Assignee: California Institute of Technology,
Pasadena, CA (US)

( * ) Notice: Subject to any disclaimer, the term of this patent is extended or adjusted under 35 U.S.C. 154(b) by 596 days.

(21) Appl. No.: 13/415,657

(22) Filed: Mar. 8, 2012

(65) Prior Publication Data

US 2012/0228475 A1    Sep. 13, 2012

Related U.S. Application Data

(60) Provisional application No. 61/450,718, filed on Mar. 9, 2011.

(51) Int. Cl.
*H01L 27/146* (2006.01)
*G02B 5/18* (2006.01)
*G02B 21/06* (2006.01)
*G02B 21/36* (2006.01)

(52) U.S. Cl.
CPC .............. *G02B 5/1842* (2013.01); *G02B 21/06* (2013.01); *G02B 21/367* (2013.01)

(58) Field of Classification Search
CPC ............. A61B 6/00; G21K 1/06; G01N 23/04
USPC .................................... 250/208.1; 378/36, 62
See application file for complete search history.

(56) References Cited

U.S. PATENT DOCUMENTS

| 4,165,464 A | 8/1979 | Ikeda et al. |
| 4,580,151 A | 4/1986 | Bamba |
| 4,981,362 A | 1/1991 | DeJong et al. |
| 5,384,573 A | 1/1995 | Turpin |
| 5,583,342 A | 12/1996 | Ichie et al. |
| 5,587,832 A | 12/1996 | Krause |
| 5,795,755 A | 8/1998 | Lemelson |
| 5,796,112 A | 8/1998 | Ichie |
| 5,936,764 A | 8/1999 | Kobayashi |

(Continued)

FOREIGN PATENT DOCUMENTS

| EP | 1371965 | 12/2003 |
| JP | 80-015156 | 1/1996 |

(Continued)

OTHER PUBLICATIONS

International Search Report and Written Opinion in International Application No. PCT/US2011/025751 mailed on Oct. 25, 2011.

(Continued)

*Primary Examiner* — Seung C Sohn
(74) *Attorney, Agent, or Firm* — Sheila Martinez-Lemke; Weaver Austin Villeneuve & Sampson LLP

(57) ABSTRACT

Talbot imaging systems comprising a Talbot element, a phase gradient generating device, a light detector, and a processor. The Talbot element repeats a Talbot image at a distance from the Talbot element. The phase gradient generating device scans the Talbot image at a plane at the distance from the Talbot element by incrementally changing a phase gradient of a light field incident the Talbot element. As the Talbot image is scanned, the light detector captures time varying data associated with light altered by an object located at the distance from the Talbot element. The processor reconstructs an image of the object based on the time-varying light data.

20 Claims, 10 Drawing Sheets

(56) References Cited

U.S. PATENT DOCUMENTS

| | | | |
|---|---|---|---|
| 5,973,316 | A | 10/1999 | Ebbesen et al. |
| 6,133,986 | A | 10/2000 | Johnson |
| 6,219,441 | B1 | 4/2001 | Hu |
| 6,248,988 | B1 | 6/2001 | Krantz |
| 6,525,815 | B2 | 2/2003 | Kung et al. |
| 6,628,385 | B1 | 9/2003 | Osipchuk et al. |
| 6,636,300 | B2 | 10/2003 | Doemens et al. |
| 6,646,773 | B2 | 11/2003 | Garner |
| 6,731,391 | B1 | 5/2004 | Kao et al. |
| 6,865,246 | B2 | 3/2005 | Yang |
| 7,045,781 | B2 | 5/2006 | Adamec et al. |
| 7,057,806 | B2 | 6/2006 | Atkinson |
| 7,209,287 | B2 | 4/2007 | Lauer |
| 7,235,777 | B2 | 6/2007 | Hecht |
| 7,250,598 | B2 | 7/2007 | Hollingsworth et al. |
| 7,310,150 | B2 | 12/2007 | Guillermo et al. |
| 7,358,478 | B2 | 4/2008 | Price |
| 7,400,436 | B2 | 7/2008 | Hendriks et al. |
| 7,468,507 | B2 | 12/2008 | Rogers et al. |
| 7,477,380 | B2 | 1/2009 | Knebel et al. |
| 7,567,346 | B2 | 7/2009 | Fomitchov et al. |
| 7,576,862 | B2 | 8/2009 | Cromwell et al. |
| 7,641,856 | B2 | 1/2010 | Padmanabhan et al. |
| 7,642,536 | B2 | 1/2010 | Baer |
| 7,751,048 | B2 | 7/2010 | Yang et al. |
| 7,768,654 | B2 | 8/2010 | Cui et al. |
| 7,773,227 | B2 | 8/2010 | Yang et al. |
| 7,982,883 | B2 | 7/2011 | Cui et al. |
| 8,039,776 | B2 | 10/2011 | Cui et al. |
| 8,189,204 | B2 | 5/2012 | Cui et al. |
| 8,767,216 | B2 | 7/2014 | Yang et al. |
| 8,855,265 | B2 * | 10/2014 | Engel et al. .................. 378/62 |
| 8,946,619 | B2 | 2/2015 | Wu et al. |
| 8,970,671 | B2 | 3/2015 | Pavani et al. |
| 9,046,680 | | 6/2015 | Cui et al. |
| 2002/0159047 | A1 | 10/2002 | Dubois |
| 2003/0203502 | A1 | 10/2003 | Zenhausern et al. |
| 2003/0218756 | A1 | 11/2003 | Chen et al. |
| 2005/0162440 | A1 | 7/2005 | Kleen |
| 2005/0190376 | A1 | 9/2005 | Wegmann et al. |
| 2005/0271548 | A1 | 12/2005 | Yang et al. |
| 2005/0286101 | A1 | 12/2005 | Garner et al. |
| 2006/0152780 | A1 | 7/2006 | Klug et al. |
| 2007/0086020 | A1 | 4/2007 | Han et al. |
| 2007/0109619 | A1 | 5/2007 | Eberl et al. |
| 2007/0109633 | A1 | 5/2007 | Stelzer |
| 2007/0207061 | A1 | 9/2007 | Yang et al. |
| 2007/0245363 | A1 | 10/2007 | Bakker et al. |
| 2007/0258096 | A1 | 11/2007 | Cui et al. |
| 2007/0277192 | A1 | 11/2007 | Hendriks et al. |
| 2008/0008939 | A1 | 1/2008 | Klug et al. |
| 2008/0049234 | A1 | 2/2008 | Seitz |
| 2008/0100892 | A1 | 5/2008 | Hendriks et al. |
| 2008/0121790 | A1 | 5/2008 | Grier |
| 2008/0212430 | A1 | 9/2008 | Bakker et al. |
| 2009/0218514 | A1 | 9/2009 | Klunder et al. |
| 2009/0218527 | A1 | 9/2009 | French et al. |
| 2009/0225319 | A1 | 9/2009 | Lee et al. |
| 2009/0225411 | A1 | 9/2009 | Cui et al. |
| 2009/0225413 | A1 | 9/2009 | Stelzer et al. |
| 2009/0231689 | A1 | 9/2009 | Pittsyn et al. |
| 2009/0276188 | A1 | 11/2009 | Cui et al. |
| 2010/0059696 | A1 | 3/2010 | Heintzmann et al. |
| 2010/0099984 | A1 | 4/2010 | Graser |
| 2010/0195873 | A1 | 8/2010 | Cui et al. |
| 2010/0309457 | A1 | 12/2010 | Cui et al. |
| 2010/0322494 | A1 | 12/2010 | Fauver et al. |
| 2011/0085219 | A1 | 4/2011 | Yang et al. |
| 2011/0170105 | A1 | 7/2011 | Cui et al. |
| 2011/0181884 | A1 | 7/2011 | Cui et al. |
| 2011/0205339 | A1 | 8/2011 | Pavani et al. |
| 2011/0205352 | A1 | 8/2011 | Pavani et al. |
| 2011/0234757 | A1 | 9/2011 | Zheng et al. |
| 2012/0061554 | A1 | 3/2012 | Cui et al. |
| 2012/0098950 | A1 | 4/2012 | Zheng et al. |
| 2012/0223217 | A1 | 9/2012 | Zheng et al. |
| 2012/0267515 | A1 | 10/2012 | Wu et al. |

FOREIGN PATENT DOCUMENTS

| | | |
|---|---|---|
| JP | 2003207454 A | 7/2003 |
| JP | 2003524779 A | 8/2003 |
| KR | 10-2005-006253 | 6/2005 |
| WO | WO-0210713 A2 | 2/2002 |
| WO | WO-2008107702 A1 | 9/2008 |
| WO | WO 2010/040570 | 4/2010 |
| WO | WO 2011/035299 | 3/2011 |
| WO | WO 2011/047053 | 4/2011 |
| WO | WO-2011106324 | 9/2011 |
| WO | WO-2011106327 | 9/2011 |
| WO | WO 2012/122398 | 9/2012 |
| WO | WO 2012/145566 | 10/2012 |

OTHER PUBLICATIONS

International Search Report in International Application No. PCT/US2011/025762 mailed on Oct. 25, 2011.
Written Opinion in International Application No. PCT/US2011/025762 mailed on Oct. 25, 2011.
International Search Report and Written Opinion in International Application No. PCT/US2010/052512 mailed on Apr. 18, 2011.
European Patent Office (EPO) European Supplementary Search Report in EP Application No. 05749488.2 mailed on Jan. 26, 2012.
European Patent Office (EPO) European Supplementary Search Report in EP Patent Application No. 08730664.3 mailed Feb. 7, 2012.
Japanese Patent Office (JPO) Office Action in JPO patent Application No. 2007-515164 (Jul. 26, 2011).
Japanese Patent Office (JPO) Office Action in JPO patent Application No. 2007-515164 (May 8, 2012).
Japanese Patent Office (JPO) Office Action in JPO patent Application No. 2009-553675 (Jan. 24, 2012).
European Patent Office (EPO) Office Action in EP Patent Application No. 05749488.2 mailed on Jun. 27, 2012.
United States Patent and Trademark Office (USPTO) Office Action in U.S. Appl. No. 12/398,050 mailed on Nov. 14, 2011.
United States Patent and Trademark Office (USPTO) Notice of Allowance in U.S. Appl. No. 12/398,050 mailed on Jul. 17, 2012.
United States Patent and Trademark Office (USPTO) Office Action in U.S. Appl. No. 12/398,098 mailed on May 25, 2011.
United States Patent and Trademark Office (USPTO) Restriction Requirement in U.S. Appl. No. 12/399,823 mailed on Aug. 10, 2011.
United States Patent and Trademark Office (USPTO) Non-Final Office Action in U.S. Appl. No. 12/399,823 mailed on Nov. 14, 2011.
United States Patent and Trademark Office (USPTO) Final Office Action in U.S. Appl. No. 12/399,823 mailed on May 25, 2012.
"Beam Steering Using Liquid Crystals," Boulder Nonlinear Systems, downloaded from the Internet at http://www.bnonlinear.com/papers/LCBeamSteering.pdf, May 8, 2001.
"Talbot Effect," Wikipedia, last modified Dec. 27, 2011.
"Nipkow Disk" Wikipedia, last modified Aug. 13, 2010.
Bates et al, "Multicolor super-resolution imaging with photo-switchable fluorescent probes," Science 317, 1749-1753 (2007).
Besold, G. and Lindlein, "Fractional Talbot effect for periodic microlens arrays", Optics Engineering, vol. 36, pp. 1099-1105 (Apr. 1997).
Betzig, E., et al.,"Imaging intracellular fluorescent proteins at nanometer resolution," Science, vol. 313, pp. 1642-1645 (2006).
Bishara et al., "Lensfree on-chip microscopy over a wide field-of-view using pixel super-resolution," Opt. Expr. 18, pp. 11181-11191 (2010).
Chalut, K. J., et al., "Quantitative phase microscopy with asynchronous digital holography," Optics EXpress, vol. 15, pp. 3047-3052 (2007).
Conchello, Jose-Angel, and Lichtman, Jeff W., "Optical sectioning microscopy," Nature Methods, vol. 2, No. 12, pp. 920-931 (Dec. 2005).
Cui, Xiquan, et al., "Lensless high-resolution on-chip optofluidic microscopes for *Caenorhabditis elegans* and cell imaging," Proceed-

(56) References Cited

OTHER PUBLICATIONS ings of the National Academy of Sciences of the Unities States of America, vol. 105, pp. 10670-10675 (2008).

Di Mambro et al., "Sharpness limitations in the projection of thin lines by use of the Talbot experiment," J. Opt. Soc. Am. A 21, pp. 2276-2282 (2004).

Eah et al., "Nearly diffraction-limited focusing of a fiber aXicon microlens," Rev. Sci. Instrum. 74(11), 4969-4971 (2003).

Frey, H.G., et al.,"High-resolution imaging of single fluorescent molecules with the optical near-field of a metal tip," Phys. Rev. Let. 93, 200801 (2004).

Giloh et al., "Fluorescence microscopy: reduced photobleaching of rhodamine and fluorescein protein conjugates by n-Propyl Gallate," Science 217, pp. 1252-1255 (1982).

Grosjean et al., "Fiber MicroaXicons Fabricated by a Polishing Technique for the Generation of Bessel-Like Beams," Applied Optics 46(33) 8061-8063 (2007).

Heng, Xin, et al., "An Optical Tweezer Actuated, Nanoaperture-grid based Optofluidic Microscope Implimentation Method," Optics EXpress, vol. 15, No. 25, 16367-75 (2007).

Heng, Xin, et al., "Optofluidic Microscopy—a method for implementing a high resolution optical microscope on a chip," Lab Chip, vol. 6, pp. 1274-1276 (2006).

Ho, J., et al., "Use of whole slide imaging in surgical pathology quality assurance: design and pilot validation studies," Human Pathology 37, pp. 322-331 (2006).

Kimura, Yasuo, et al., "Compact optical head using a holographic optical element for CD players," Appl. Opt. 27, pp. 668-671 (1988).

Lee, Lap Man, et al., "The Application of On-Chip Optofluidic Microscopy for Imaging Giardia lamblia Trophozoites and Cysts," Biomed Microdevices, Springer DOI 10.1007/s10544-009-9312-X (2009).

Leger, J.R., et al, "Efficient array illuminator using binary-optics phase plates at fractional-Talbot planes," Optics Letters 15, pp. 288-290 (1990).

Lohmann, A.W. and Silva D.E., "An Interferometer based on the Talbot Effect," Optics Communications, vol. 2, No. 9, pp. 413-415 (Feb. 1971).

Marquet, Pierre, et al., "Digital holographic microscopy: a noninvasive contrast imaging technique allowing quantitative visualization of living cells with subwavelength aXial accuracy," Optics Letters, vol. 30, No. 5, pp. 468-470 (Mar. 2005).

Miao, Qin, et al., "Dual-modal three-dimensional imaging of single cells with isometric high resolution using an optical projection tomography microscope," Journal of Biomedical Optics, vol. 14 (2009).

Merenda, F., et al., "Miniaturized high-NA focusing-mirror multiple optical tweezers," Opt. EXp. 15, 6075-6086 (2007).

Montgomery, W.D., "Self-Imaging Objects of Infinite Aperture," J. Opt. Soc. Am., vol. 57, pp. 772-775 (1967).

Oheim, "High-throughput microscopy must re-invent the microscope rather than speed up its functions," Brit, J. Pharm. 152, op. 1-4 (2007).

Pang, Sean, et al., "Implementation of a color-capable optofluidic microscope on a RGB CMOS color sensor chip substrate," Lab on a Chip, vol. 10, pp. 411-414 (2010).

Patorski, "The self-imaging phenomenon and its applications," Progress in Opt. 27, pp. 3-108 (1989).

Pfeiffer, F., et al., "Hard-X-ray dark-field imaging using a grating interferometer," Nature Materials 7, pp. 134-137 (2008).

Pfeiffer, Franz, et al., "Phase retrieval and differential phase-contrast imaging with low-brilliance X-ray sources," Nat. Phys, vol. 2, pp. 258-261 (published online on Mar. 26, 2006).

Planchon, et al., "Rapid three-dimensional isotropic imaging of living cells using Bessel beam plane illumination," Nat. Methods 8(5) (2011).

Rojo, et al., "Critical comparison of 31 commercially available digital slide systems in pathology," Int'l J. Surg. Path. 14, pp. 285-305 (2006).

Sanchez, E.J., et al., "Near-field fluorescence microscopy based on two-photon eXcitation with metal tips," Phys. Rev. Let. 82, 4014 (1999).

Talbot, "LXXVI. Facts relating to optical science. No. IV," Philosophical Magazine Series 39, pp. 401-407 (1836).

Tao et al., "The generation of an array of nondiffracting beams by a single composite computer generated hologram," J. Opt. A: Pure Appl. Opt. 7, 40-46 (2005).

Titus, Charles M., et al., "Efficient, Accurate Liquid Crystal Digital Light Deflector," Proc. SPIE, vol. 3633(1), pp. 244-253 (Jun. 1999).

Tsien, Roger, et al., "Fluorophores for Confocal Microscopy: Photophysics and Photochemistry," Handbook of Biological Confocal Microscopy, third edition, Springer Science + Business Media, pp. 38-352 (2006).

Turunen, et al., "Holographic generation of diffraction-free beams," Appl. Opt. 27(19), 3959-3962 (1988).

Wu, et al., "Focal Plane tuning in Wide Field-of-view Microscope with Talbot Pattern Illumination," Opt. Lett. 36, 2179-2181 (2011).

Wu, J., et al., "Focus grid generation by in-line holography," Optics Express, vol. 18, p. 14366-14374 (2010).

Wu, J., Cui, X., Lee, L. M., and Yang, C., "The application of Fresnel zone plate based projection in optofluidic microscopy," Opt. Exp. 16, 15595 (2008).

Wu, J., et al., "Wide field-of-view microscope based on holographic focus grid illumination," Optics Letters, vol. 35, No. 13 (2010).

Zapata-Rodriguez, Carlos, et al., "Three-dimensional Field Distribution in the Focal Region of Low-Fresnel-Number AXicons," F. Opt. Soc. Am. A 23(12) 3016-3017 (2005).

Zheng, G.A., et al., "Sub-pixel resolving optofluidic microscope for on-chip cell imaging," Lab on a Chip, vol. 10, pp. 3125-3129 (2010).

Zheng, G., et al., "Supplementary Information for: Sub-pixel resolving optofluidic microscope for on-chip cell imaging," Lap Chip, vol. 10 (2010).

Zhu et al., "Generation of controllable nondiffracting beams using multimode optical fibers," Appl. Phys. Lett. 94, 201102 (2009).

Wu, Jigang, et al., "Focal plane tuning in wide-field-of-view microscope with Talbot pattern illumination," Optics Letters 36 (12), pp. 2179-2181 (2011).

Zheng, Guoan, "The ePetri dish, an on-chip cell imaging platform based on subpixel perspective sweeping microscopy (SPSM)," Proceedings of the National Academy of Science 108 (41), pp. 16889-16894 (2011).

Pang, Shuo, et al., "Fluorescence microscopy imaging with a Fresnel zone plate array based optofluidic microscope," Lab on a Chip 11, 3698-3702, (2011).

United States Patent and Trademark Office (USPTO) Non-Final Office Action in U.S. Appl. No. 12/903,650 dated on Jan. 14, 2013.

United States Patent and Trademark Office (USPTO) Final Office Action in U.S. Appl. No. 12/903,650 dated on Nov. 7, 2013.

United States Patent and Trademark Office (USPTO) Notice of Allowance in U.S. Appl. No. 12/903,650 dated on Feb. 26, 2014.

United States Patent and Trademark Office (USPTO) Notice of Allowance in U.S. Appl. No. 12/903,650 dated on Apr. 25, 2014.

United States Patent and Trademark Office (USPTO) Non-Final Office Action in U.S. Appl. No. 13/032,449 dated on Mar. 7, 2014.

United States Patent and Trademark Office (USPTO) Notice of Allowance in U.S. Appl. No. 13/032,449 dated on Nov. 3, 2014.

United States Patent and Trademark Office (USPTO) Non-Final Office Action in U.S. Appl. No. 13/032,529 dated on Feb. 13, 2014.

United States Patent and Trademark Office (USPTO) Final Office Action in U.S. Appl. No. 13/032,529 dated on Sep. 11, 2014.

United States Patent and Trademark Office (USPTO) Non-Final Office Action in U.S. Appl. No. 13/451,543 dated on Jun. 11, 2014.

United States Patent and Trademark Office (USPTO) Notice of Allowance in U.S. Appl. No. 13/451,543 dated on Sep. 30, 2014.

United States Patent and Trademark Office (USPTO) Non-Final Office Action in U.S. Appl. No. 12/399,823 dated on May 15, 2014.

United States Patent and Trademark Office (USPTO) Final Office Action in U.S. Appl. No. 12/399,823 dated on Nov. 10, 2014.

Japanese Patent Office (JPO) Office Action dated May 8, 2012 issued in JPO patent Application No. 2007-515164.

PCT International Preliminary Report on Patentability and Written Opinion dated Apr. 26, 2012 issued in PCT/US2010/052512.

(56) References Cited

OTHER PUBLICATIONS

PCT International Preliminary Report on Patentability and Written Opinion dated Sep. 7, 2012 issued in PCT/US2011/025751.
PCT International Preliminary Report on Patentability dated Sep. 7, 2012 issued in PCT/US2011/025762.
PCT International Search Report and Written Opinion dated Sep. 3, 2012 issued in PCT/US2012/028328.
PCT International Preliminary Report on Patentability and Written Opinion dated Sep. 19, 2013 issued in PCT/US2012/028328.
PCT International Search Report and Written Opinion dated Nov. 28, 2012 issued in PCT/US2012/034339.
PCT International Preliminary Report on Patentability and Written Opinion dated Oct. 31, 2013 issued in PCT/US2012/034339.
Confocal Microscopy, Wikipedia, last modified Aug. 25, 2010, 3 pages.
Confocal Raman Microscopy (Oct. 2006) "Optofluidic Microscope Enables Lensless Imaging of Microorganisms," *Biophotonics International*, 13(10):24.
Types of confocal microscopy, downloaded from the Internet at http://www.mikriskipie.org/2008/01/26/types-of-confocal-microscopy/14/ on Sep. 10, 2010, 1 page.
Brockie et al., (Mar. 1, 2001) "Differential Expression of Glutamate Receptor Subunits in the Nervous System of *Caenorhabditis elegans* and Their Regulation by the Homeodomain Protein UNC-42," *The Journal of Neuroscience*, 21(5):1510-1522.
Coskun, A.F., et al., (Sep. 7, 2011) "Wide-field lensless fluorescent microscopy using a tapered fiber-optic faceplate on a chip," *Analyst*, 136(17):3512-3518.
Dubey et al., (2007) "Wavelength-scanning Talbot effect and its application for arbitrary three-dimensional step-height measurement," *Optics Communications*, 279:13-19.
Garcia-Sucerquia, J. et al., (2006) "Immersion digital in-line holographic microscopy," *Optics Letters*, 31:1211-1213.
Goodman et al., (2005) "Holography," Chapter 9: pp. 297-393, *Introduction to Fourier Optics*, 3rd Edition, Roberts & Company Publishers.
Han, (2013) "Wide-Field-of-View On-Chip Talbot Fluorescence Microscopy for Longitudinal Cell Culture Monitoring from within the Incubator," *Analytical Chemistry* 85(4):2356-2360.
Kagalwala, Farhana and Kanade, Takeo (Oct. 2003) "Reconstructing Specimens Using DIC Microscope Images," *IEEE Transactions on Systems, Man, and Cybernetics-Part B: Cybernetics*, 33(5)728-737.
Lange et al., (2005) "A microfluidic shadow imaging system for the study of the nematode *Caenorhabditis elegans* in space," *Sensors and Actuators* B, 107:904-914.
López-Mariscal, Carlos et al., (Jan. 1, 2007) "The generation of nondiffracting beams using inexpensive computer-generated holograms," *Am. J. Phys.*, 75(1):36-42.
Merenda, F., et al., (2007) "Miniaturized high-NA focusing-mirror multiple optical tweezers," *Opt. Exp.* 15:6075-6086.
Mudanyali, O., et al., (Jun. 7, 2010) "Compact, light-weight and cost-effective Microscope based on Lensless Incoherent Holography for Telemedicine Applications," *Lab on a Chip*, 10:1417-1428, 25 pages.
Nozokido, Tatsuo, et al., (2001) "Scanning Near-Field Millimeter-Wave Microscopy Using a Metal Slit as a Scanning Probe," *IEEE Transactions on Microwave Theory and Techniques*, 49(3):491-99.
Ottevaere et al., (2006) "Comparing glass and plastic refractive microlenses fabricated with different technologies," *Journal of Optics a-Pure and Applied Optics*, 8(7):S407-S429.
Pang et al., (Dec. 1, 2012) "Wide and Scalable Field-of View Talbot-Grid-Based Fluorescence Microscopy," *Optic Letters* 37(23):5018-5020.
Pang et al., (Jun. 17, 2013) "Wide Field of View Talbot grid-based microscopy for multicolor fluorescence imaging," *Optic Express*, 21(12):14555-14565.
Perkins et al., (1986) "Mutant Sensory Cilia in the Nematode *Caenorhabditis elegans*," *Developmental Biology*, 117:456-487.
Repetto L., et al., (2004) "Lensless digital holographic microscope with light-emitting diode illumination," *Opt. Lett.*, 29:1132-1134.
Richard et al., (2009) "An integrated hybrid interference and absorption filter for fluorescence detection in lab-on-a-chip devices," *Lab on a Chip*, 9:1371:1376.
Seo, et al., (2009) "Lensfree holographic imaging for on-chip cytometry and diagnostics," *Lab on a Chip*, 9(6):777-787.
Slavich "Technical specifications of holography materials," downloaded from the Internet at http://www.slavich.com/holo_summary [retrieved on Jun. 12, 2013], 2pp.
Spring, Kenneth R., et al., "Introduction to Fluorescence Microscopy," <http://www.microscopyu.com/articles/fluorescence/fluorescenceintro.html> (Aug. 25, 2004), 13 pp.
Tam et al., (May 24, 2004) "An imaging fiber-based optical tweezer array for microparticle array assembly," *Appl. Phys. Lett.*, 84(21):4289-4291.
Tsien, Roger, et al., (1998) "The green fluorescent protein," *Annual Review of Biochemistry*, 67:509-544.
Turunen, et al., (1988) "Holographic generation of diffraction-free beams," *Appl. Opt.* 27(19):3959-3962.
Wang et al., (2009) "Characterization of acceptance angles of small circular apertures," *Optics Express* 17(26):23903-23913.
Wang et al. (Jun. 26, 2012) "Deep-tissue focal fluorescence imaging with digitally time-reversed ultrasound-encoded light," *Nature Communications* 3(928):8 pages.
Xu, et al. (2001) "Digital in-line holography for biological applications," *PNAS USA*, 98:11301-11305.
United States Patent and Trademark Office (USPTO) Notice of Allowance in U.S. Appl. No. 12/399,823 dated on Jan. 29, 2015.
United States Patent and Trademark Office (USPTO) Office Action in U.S. Appl. No. 13/032,529 dated on May 21, 2015.
Čižmár et al. (Aug. 19, 2005) "Optical conveyor belt based on Bessel beams", *Optical Trapping and Optical Micromanipulation II, Proceeding of SPIE*, 5930:59300X-59300X.

* cited by examiner

TALBOT IMAGING DEVICES AND SYSTEMS

CROSS-REFERENCES TO RELATED APPLICATIONS

This is a non-provisional application of, and claims priority to, U.S. Provisional Patent Application No. 61/450,718 entitled "Fluorescence/Bright Field Talbot Microscope," filed on Mar. 9, 2011. This provisional application is hereby incorporated by reference in its entirety for all purposes.

This non-provisional application is related to the following commonly-assigned patent applications, which are hereby incorporated by reference in their entirety for all purposes:

U.S. patent application Ser. No. 12/903,650 entitled "Holographically Illuminated Imaging Devices" filed on Oct. 13, 2010.

STATEMENT AS TO RIGHTS TO INVENTIONS MADE UNDER FEDERALLY SPONSORED RESEARCH OR DEVELOPMENT

This invention was made with government support under Grant No. W81XWH-09-1-0051 awarded by the US Army Medical Research and Material Command and Grant No. AI096226 awarded by the National Institutes of Health. The government has certain rights in the invention.

BACKGROUND OF THE INVENTION

Embodiments of the present invention generally relate wide field-of-view, high resolution imaging devices. More specifically, certain embodiments relate to Talbot imaging (Ti) devices and Ti systems for wide field-of-view, high-resolution bright field and fluorescence imaging used in areas such as, for example, microscopy and photography.

Optical microscopy is a important tool used in biological and clinical research. The design of optical microscopy has changed very little until a recent effort to miniaturize the microscope on an imaging sensor. Examples of recent developments in on-chip microscopes can be found in Coskun, A. F., Sencan, I., Su, T. W., and Ozcan, A., "*Wide-field lensless fluorescent microscopy using a tapered fiber-optic faceplate on a chip*," Analyst (2011) ("Coskun"); Cui, X. Q., Lee, L. M., Heng, X., Zhong, W. W., Sternberg, P. W., Psaltis, D., and Yang, C. H., "*Lensless high-resolution on-chip optofluidic microscopes for Caenorhabditis elegans and cell imaging*," Proceedings of the National Academy of Sciences of the United States of America 105, pp. 10670-10675 (2008); Heng, X., Erickson, D., Baugh, L. R., Yaqoob, Z., Sternberg, P. W., Psaltis, D. and Yang, C. H., "*Optofluidic microscopy—a method for implementing a high resolution optical microscope on a chip*," Lab on a Chip 6, pp. 1274-1276 (2006); Pang, S., Cui, X. Q., DeModena, J., Wang, Y. M., Sternberg, P., and Yang, C. H. "*Implementation of a color-capable optofluidic microscope on a RGB CMOS color sensor chip substrate*," Lab on a Chip 10, pp. 411-414 (2010); and Zheng, G. A., Lee, S. A., Yang, S., and Yang, C. H., "*Sub-pixel resolving optofluidic microscope for on-chip cell imaging*," Lab on a Chip 10, pp. 3125-3129 (2010), which are hereby incorporated by reference in their entirety for all purposes.

Fluorescence is an important optical readout mode in microscopy because it can be much more sensitive and specific than absorbance and reflectance, as discussed in Tsien, R. Y., Ernst, L., and Waggoner, A., "*Fluorophores for Confocal Microscopy: Photophysics and Photochemistry*," Handbook Of Biological Confocal Microscopy, pp. 338-352 (2006), which is hereby incorporated by reference in its entirety for all purposes. Many on-chip microscopes cannot achieve the optical resolution in fluorescence imaging comparable to that achievable by a convention microscope.

BRIEF SUMMARY OF THE INVENTION

Embodiments of the present invention relate to a Ti system a Ti device with a Talbot element, a phase gradient generating device, a light detector, and a processor. The Talbot element repeats a Talbot image (e.g., array of focal spots) at a plane at a distance from itself based on the Talbot effect. A small linear phase gradient change of the incident light field can induce a relatively large lateral translational shift of the Talbot image. The phase gradient generating device scans the Talbot image over an object at the plane by incrementally changing the phase gradient of the incident light field over time. As the Talbot image is scanned, the light detector captures time varying data associated with the light altered by the object. The processor constructs an image of the object based on the time varying data. The Ti device may also include a collection element located between the light detector and the Talbot element to pass emissions and reject excitation light to the light detector. In this case, the processor can construct a fluorescence image based on the time varying data.

The Talbot effect is a self-imaging effect of certain patterned and some periodic structures, as described in Talbot, H. F., "*LXXVI. Facts relating to optical science. No. IV*," Philosophical Magazine Series 3 9, pp. 401-407 (1836). The patterned image is repeated at regular distances away from the Talbot element. The distance between the repeated images is called a Talbot distance ($l_t$). For a square grid pattern, the Talbot distance $l_t = 2 d^2/\lambda$, where d is the pattern period and $\lambda$ is the wavelength of the incident light, as described in Montgomery, W. D. "*Self-Imaging Objects of Infinite Aperture*," J. Opt. Soc. Am. 57, pp. 772-775 (1967). The Talbot effect can be used as an illumination source, and also used to detect the phase information from a sample, as discussed in Lohmann, A. W. and Silva, D. E. "*An interferometer based on the Talbot effect*," Optics Communications 2, pp. 413-415 (1971). Further research shows sensitivity of the Talbot effect (Talbot image) to the phase change by a sample can be used in X-ray DIC and dark field imaging of the sample, as described in Pfeiffer, F., Bech, M., Bunk, O., Kraft, P., Eikenberry, E. F., Brönnimann, C., Grünzweig, C. and David, C. "*Hard-X-ray dark-field imaging using a grating interferometer*," Nature Materials 7, pp. 134-137 (2008) and in Pfeiffer, F., Weitkamp, T., Bunk, O. and David, C., "*Phase retrieval and differential phase-contrast imaging with low-brilliance X-ray sources*," Nature Physics 2, pp. 258-261 (2006). The cited references in this paragraph are hereby incorporated by reference in their entirety for all purposes.

One embodiment is directed to a Talbot imaging device comprising a Talbot element and a phase gradient generating device, a light detector, and a processor. The Talbot element repeats a Talbot image at a distance from the Talbot element. The phase gradient generating device scans the Talbot image (e.g., array of focal spots) at a plane at the distance from the Talbot element by incrementally changing a phase gradient of a light field incident the Talbot element. The Talbot imaging device may also include a light detector that captures time varying data as the Talbot image is scanned. The time varying data is associated with light altered by an object located at the distance from the Talbot element. The Talbot imaging device may also include a processor that can reconstruct an image of the object based on the time-varying light data.

Another embodiment is directed to a Talbot imaging system comprising a Talbot image device and a processor. The Talbot imaging device comprises a Talbot element, a phase gradient generating device, and a light detector. The Talbot element repeats a Talbot image at a distance from the Talbot element. The phase gradient generating device scans the Talbot image by incrementally changing a phase gradient of a light field incident the Talbot element. As the Talbot image is scanned, the light detector captures time-varying light data associated with light altered by an object located at the distance from the Talbot element. The processor reconstructs an image of the object based on the time-varying light data.

Another embodiment is directed to a method of imaging using a Talbot imaging system. The method incrementally changes a phase gradient of a light field incident a Talbot element to scan a Talbot image at a plane at a distance from the Talbot element. The method also receives light altered by an object located at the plane. The method also generates time varying data based on the light received by the light detector. The method also constructs an image of the object based on the time varying light data.

These and other embodiments of the invention are described in further detail below.

DETAILED DESCRIPTION OF THE INVENTION

Figure 1:
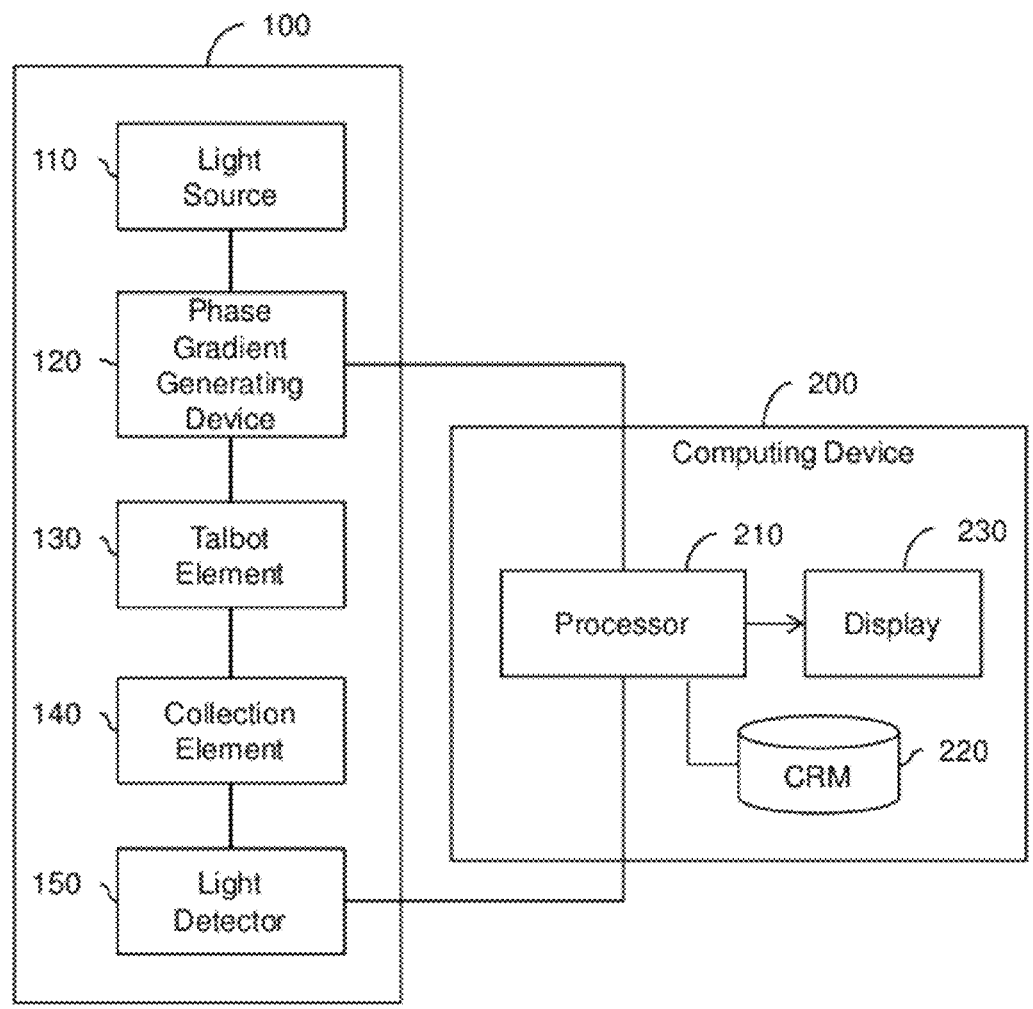
FIG. 1 is a schematic diagram of components of a Ti system, according to embodiments of the invention.

Embodiments of the present invention will be described below with reference to the accompanying drawings. Some embodiments include a Ti system having a Ti device and a processor. The Ti device includes a Talbot element, a phase gradient generating device, and a light detector. The Talbot element repeats a Talbot image (e.g., array of focal spots) at a plane at a distance of an integer multiple of a half Talbot distance, $nl_{t\_2}$, from itself. A small linear phase gradient change of the incident light field can induce a relatively large lateral translational shift of the Talbot image. The phase gradient generating device can scan the Talbot image over an object at the plane by changing the phase gradient of the light field incident the Talbot element over time. As the Talbot image is scanned over the object, the light detector captures time varying light data associated with light altered by the object. The processor receives one or more signals with the time varying light data from the light detector and reconstructs an image of the object based on the time-varying light data. In fluorescence imaging embodiments, the Ti device also includes a collection element between the light detector and the Talbot element to pass emissions and reject excitation light.

Embodiments of the invention provide one or more technical advantages. An advantage of embodiments is large field-of-view imaging. In embodiments, the field-of-view may be determined based on the size of the Talbot element (e.g., plate size) and the size of the light detector. In some cases, the Talbot element size and size of the light detector are on the order of centimeters, which may be 100 times larger than the field-of-view of a conventional microscope. Another advantage of embodiments over conventional methods may be a faster scan speed in performing a full field scan and a faster imaging time. Embodiments use multiple excitation spots which allow for a faster scan speed compared with conventional confocal and other scanning optical microscopy that use an objective lens. In comparison with conventional confocal microscopy applying a Nipkow disk to generate multiple excitation spots, embodiments of the invention can provide a faster scan speed since a smaller phase gradient is needed to perform a full field scan. Also, the field-of-view in conventional confocal microscopes is typically less than 1 mm×1 mm. To achieve a large field-of-view of around 1 cm×1 cm in a confocal microscope, a translational stage is needed. Embodiments of the invention eliminate the need for a translational stage and the time needed for stage movement, which can improve imaging time. Another advantage of embodiments may be improved uniformity of the image over conventional scanning microscope methods. The Talbot element homogenizes the input beam intensity in the repeated intensity patterns (Talbot images) so that the focal spots at the plane at the distance of an integer multiple of a half Talbot distance, $nl_{t\_2}$, is more uniform than the original pattern throughout the field-of-view. Also the small scanning phase gradient will induce less intensity variation of the excitation.

I. Ti System

FIG. 1 is a schematic diagram of components of a Ti system 10, according to embodiments of the invention. The Ti system 10 includes a Ti device 100 and a computing device 200 in electronic communication with the Ti device 100.

The Ti device 100 includes a light source 110, a phase gradient generating device 120, a Talbot element 130, a collection element 140, and a light detector 150. The light source 110 is in communication with the phase gradient generating device 120 to provide coherent light to the phase gradient generating device 120. In other embodiments, the light source 110 may be separate from the Ti device 100. The phase gradient generating device 120 is in communication with the Talbot element 130 to provide an incident light field to the Talbot element 130. An intensity pattern (Talbot image) is repeated at distances of integer multiples of a half Talbot distance $(l_{t\_2})$, $1l_{t\_2}$, $2l_{t\_2}$, $3l_{t\_2}$, ..., $nl_{t\_2}$, away from the Talbot element 130. The phase gradient generating device 120 can controllably change the phase gradient of the incident light field to the Talbot element 130 to scan the Talbot image over an object. The object is located at a plane at a distance of an integer multiple of a half Talbot distance $(l_{t\_2})$, $nl_{t\_2}$, away from the Talbot element 130. In one case, the phase gradient generating device 120 can sweep the phase gradient from 0 to k in both X-tilt and Y-tilt directions of the plane to scan the Talbot image (e.g., array of focal spots) from 0 to $nl_{t\_2} \times k$ in both X and Y lateral directions of the plane. The collection element 140 is in communication with the Talbot element 130 to collect or otherwise differentiate (e.g., filter) the light signal of interest from the Talbot element 130 as may or may not be altered by the object. The light detector 150 is in communication with the collection element 140 to receive the light signal of interest collected or otherwise differentiated by the collection element 140 as the Talbot image is scanned over the object.

The computing device 200 includes a processor 210, a computer readable medium (CRM) 220, and display 230. The display 230 and CRM 220 are in electronic communication with the processor 210. The display 230 is in electronic communication with the processor 210 to receive image data and other data for display. The processor 210 is in electronic communication with the CRM 220 to retrieve/store code with instructions for completing functions of the Ti system 10. The processor 210 is in electronic communication with the light detector 150 to send and/or receive signals. For example, the processor 210 may send a first trigger signal to start image acquisition and/or may receive a handshake signal from the light detector 150 once acquisition is complete. As another example, the processor 210 may receive signal(s) from the light detector 150 with time varying light data and other related data associated with the acquired images. The processor 210 is also in electronic communication with the phase gradient generating device 120 to send/receive signals. For example, the processor 210 may synchronize the phase generating with the sensor acquisition by sending a second trigger signal to the phase gradient generating device 120 to start phase generating at the same time the first trigger signal is sent to the light detector 150 to start acquisition. The processor 210 may also send a stop signal to the phase gradient generating device 120 to stop phase generating after receiving the handshake signal from the light detector 150. In other embodiments, the phase gradient generating device 120 and/or light detector 150 may not be in communication with the processor 210. For example, the light detector 150 may be configured to continuously acquire images after being started by a user and/or the phase gradient generating device 120 may continuously phase generate after being started by the user.

In an exemplary operation, an object being imaged is located between the collection element 140 and the Talbot element 130, at a plane that is a distance away from the Talbot element 130 that is an integer multiple of a half Talbot distance, $nl_{t\_2}(n=1, 2, 3, \text{etc.})$. The processor 210 sends a first trigger signal to the phase gradient generating device 120 to start phase generating and a second trigger signal to the light detector 150 to start image acquisition. The phase gradient generating device 120 starts generating an incident light field provided to the Talbot element 130. A Talbot image (e.g., array of focal spots) is repeated at a distance of an integer multiple of a half Talbot distance, $nl_{t\_2}$, away from the Talbot element 130. The phase gradient generating device 120 controls the phase gradient of the light field to achieve a full field scan of the Talbot image over the object being imaged. For example, the phase gradient generating device 120 may sweep the phase gradient from 0 to k in both X-tilt and Y-tilt directions to scan the Talbot image from 0 to $nl_{t\_2} \times k$ in both X and Y directions of the plane at a distance of $nl_{t\_2}$ from the Talbot element 130. The object alters the light from the scanning Talbot image. The collection element 140 receives light altered and unaltered by the object as the Talbot image is scanned over the object. The collection element 140 collects or otherwise differentiates the light of interest from the light received. As the Talbot image is scanned over the object, the light detector 150 receives light of interest from the collection element 140 and records time varying light data (e.g., intensity data) of altered and/or unaltered light. After the light detector 150 completes the acquisition cycle, it sends a handshake signal to the processor 210. The processor 210 sends a stop signal to the phase gradient generating device 120 and the phase gradient generating device 120 stops phase generating. The processor 210 receives a signal or signals with the time varying light data from the image sensor 150 and constructs one or more bright field and/or fluorescence images of the object 300 based on the time varying light data and other data received. The processor 210 can display the one or more images on the display 230.

Figure 2:
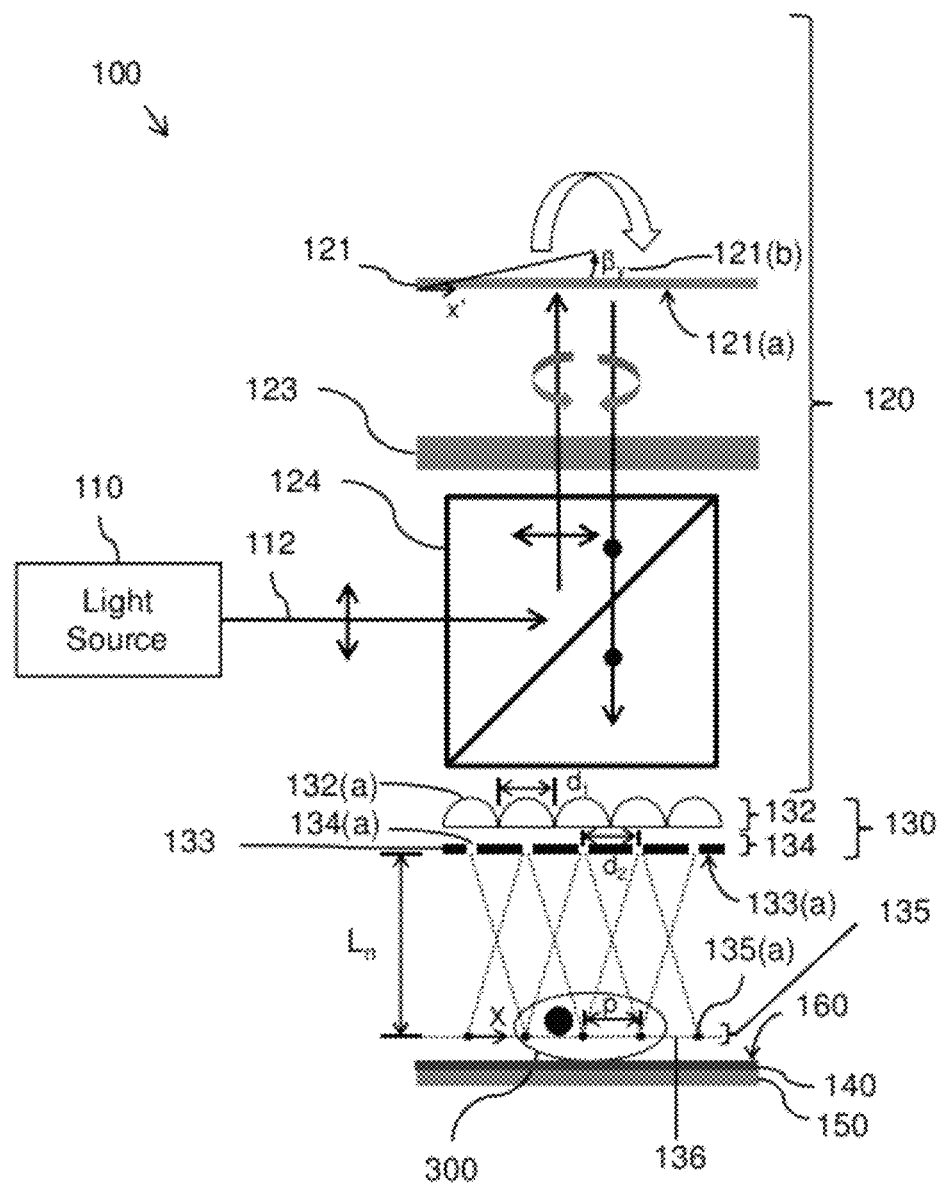
FIG. 2 is a side view of components and partial components of a Ti system of a first configuration, according to embodiments of the invention.
Figure 3:
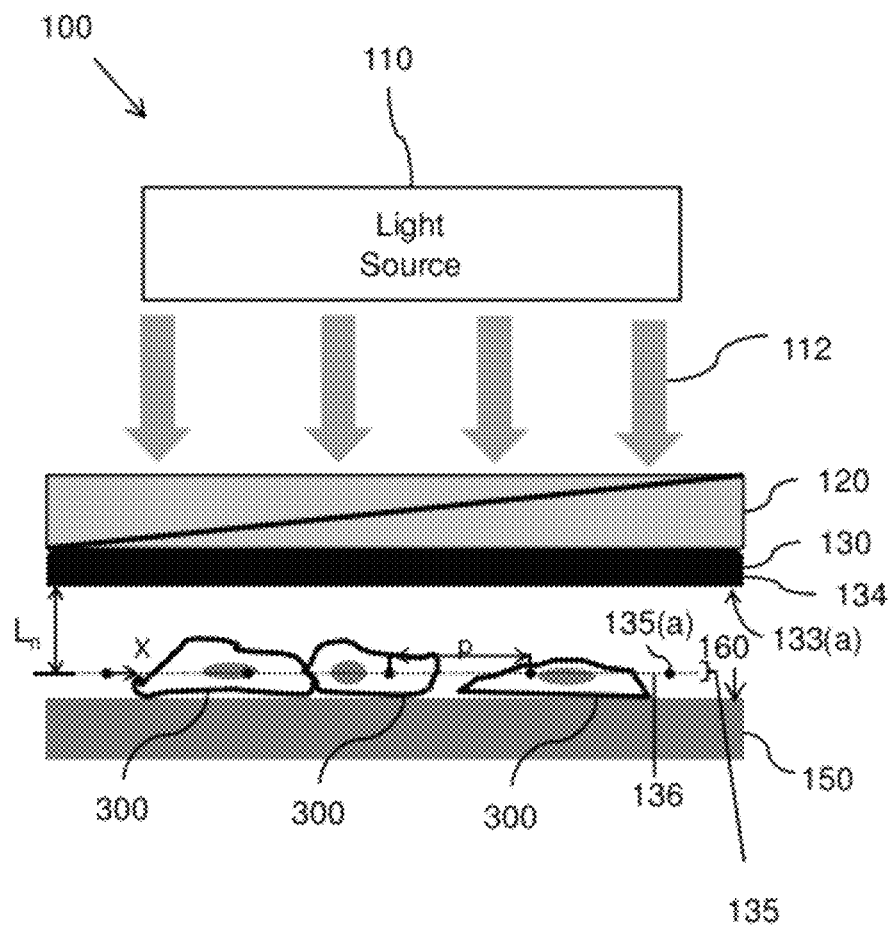
FIG. 3 is a side view of components and partial components of a Ti system of a second configuration, according to embodiments of the invention.
Figure 4:
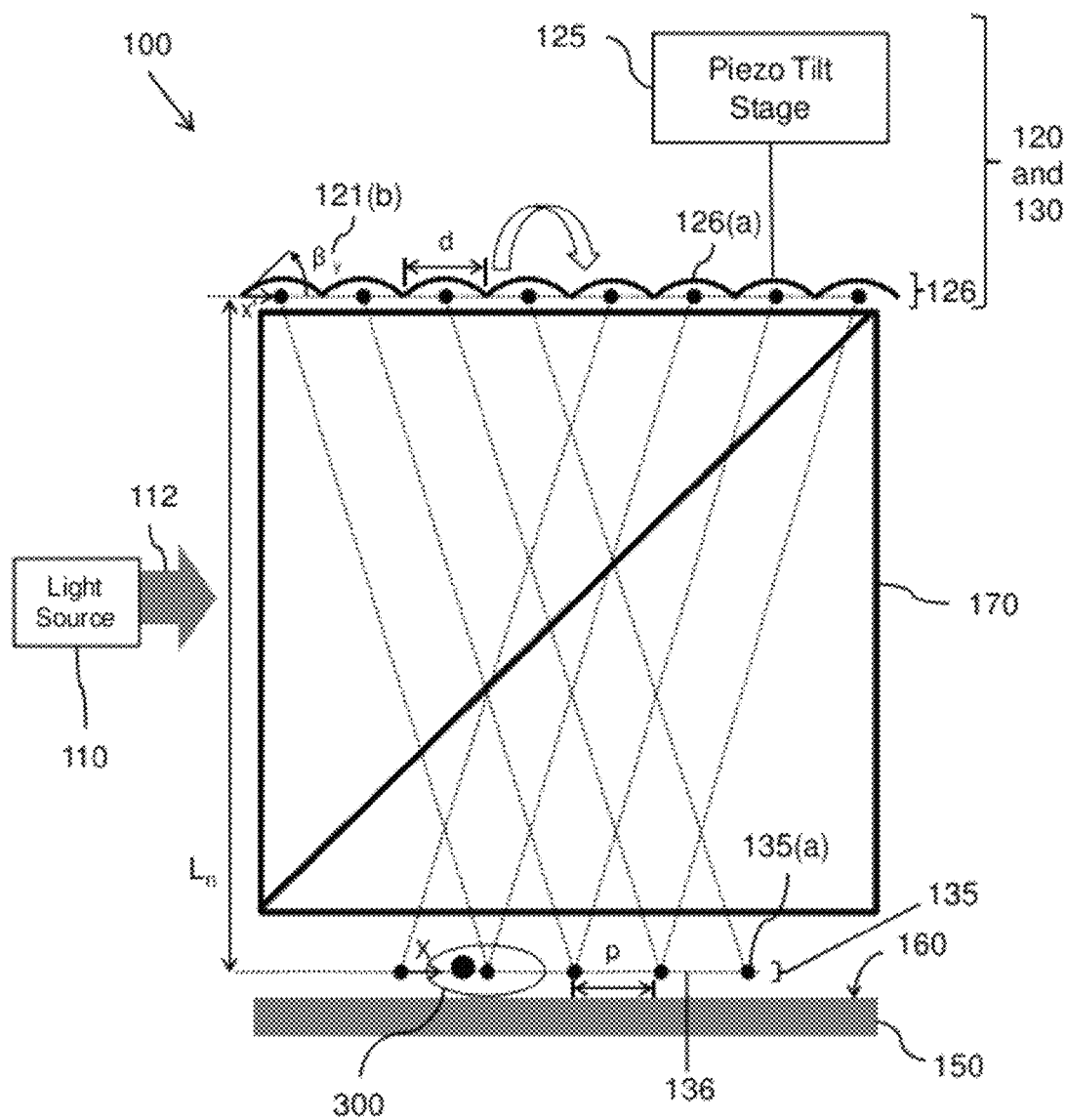
FIG. 4 is a side view of components and partial components of a Ti system of a third configuration, according to embodiments of the invention.

A light source 110 can refer to any suitable device or combination of devices that can provide spatially coherent incident light 112 (as shown in FIGS. 2, 3, and 4) to the phase gradient generating device 120. Some examples of suitable devices include a laser, narrow band LED, and a filtered line of some broadband light source. Suitable devices are commercially available. The light source 110 can be placed in any suitable location. The light source 110 may be a component of the Ti device 100, or may be separate from the Ti device 100. The incident light 112 (as shown in FIGS. 2, 3, and 4) to the phase gradient generating device 120 may have light properties (wavelength ($\lambda$), phase, intensity, etc.) with any suitable values.

A phase gradient generating device 120 can refer to a suitable device(s), structure(s), or suitable combination thereof capable of controlling the change of the phase gradient of light field incident to the Talbot element 130. The phase of the incident light field may be linear or any arbitrary phase. Some examples of suitable devices/structures include arrays (one-dimensional or two-dimensional) such a Spatial Light Modulator (SLM) array having a piezo-mirror array, a deflection mirror array, a liquid crystal array, and other suitable arrays. The dimensions of the array used may be any suitable value (e.g., 10×10, 100×100, 200×10, etc). Another example of suitable structures/devices that may be included in a phase gradient generating device 120 are beam deflectors. Some examples of suitable beam deflectors include polymers or crystals (e.g., Potassium Dihydrogen Phosphate (KDP) crystal, KNT crystal, nematic liquid crystal, wedge/blazed grating, etc.) that use electro-optical effects for beam steering; mechanically controlled beam deflectors (e.g., motors, piezo-actuators, micro-electro-mechanical system (MEMS) mirror, etc.); acoustic optical deflectors; thermal optical deflectors; hologram deflectors; and other beam deflectors (e.g., electro-wetting cell array). In on-chip embodiments of the Ti device 100, the phase gradient generating device 120 may be in the form of an on-chip device/structure. Some examples of suitable on-chip devices/structures devices include the deflection mirror array, liquid crystal array, MEMS mirror, etc.

A Talbot element 130 can refer to any suitable patterned structure or combination of patterned structures capable of creating a light field that repeats the intensity pattern (Talbot image) at distances away from the Talbot element 130 based on the Talbot effect. Some examples of suitable structures include an aperture array, micro-lens array, micro-concave mirror array, phase/amplitude gratings, other patterned diffraction structure, or any suitable combination thereof. The Talbot element 130 may be a periodic structure(s) or may be a non-periodic structure(s). An example of a repeated intensity pattern (Talbot image) is an array of focal spots.

In embodiments, the Talbot element 130 may be a periodic structure (e.g., laterally periodic diffraction structure) or combination of periodic structures. The periodic structure has a pattern that repeats structural elements (e.g., apertures) on a periodic basis according to a period, d. The periodic structure may be periodic in a single lateral direction or both lateral directions of the Talbot element 130. The period, d, may be any suitable value (e.g., 5 microns, 15 microns, 30 microns, 100 microns, etc.). Some examples of suitable periodic structures are a one-dimensional or two-dimensional array of laterally uniformly spaced structures (e.g., 2D aperture grid). The period, d, of each array is the distance between the uniformly spaced structures. For example, a suitable periodic structure may be a two-dimensional array of uniformly spaced apertures. In embodiments with a periodic Talbot element 130, the intensity pattern (Talbot image) may repeat at integer multiples, $nl_{t\_2}$, of a half Talbot distance ($l_{t\_2}$). For example, the intensity pattern (Talbot image) may repeat at $1l_{t\_2}, 2l_{t\_2}, 3l_{t\_2}, \ldots, nl_{t\_2}$, away from the Talbot element 130. In an embodiment with a periodic Talbot element 130 in the form of a two-dimensional array of apertures, the Talbot distance, $l_t = 2 d^2/\lambda$ and the half Talbot distance, $l_{t\_2} = d^2/\lambda$, where 2 is the wavelength of the incident light field and d is the distance between the apertures.

Figure 5:
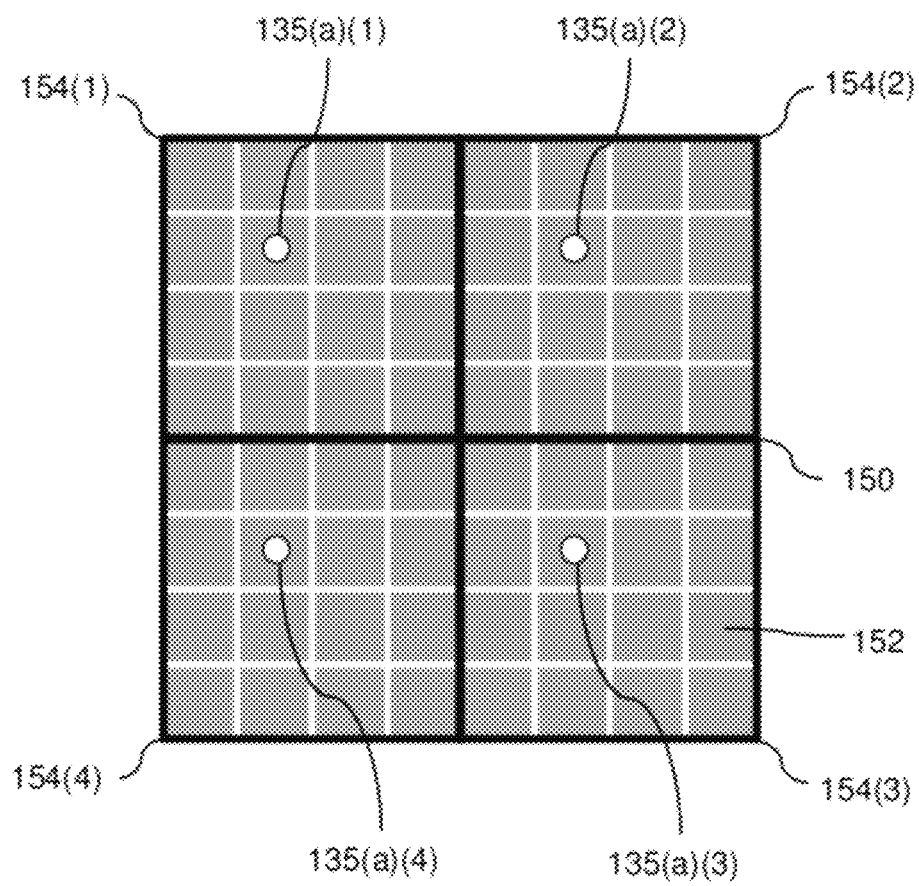
FIG. 5 is a sensor floor plan used in a direct readout mode, according to an embodiment of the invention.

In embodiments, the Talbot element 130 is a periodic structure capable of repeating a Talbot image of an array of focal spots at distances of integer multiples of a half Talbot distance ($l_{t\_2}$), $1l_{t\_2}, 2l_{t\_2}, 3l_{t\_2}, \ldots, nl_{t\_2}$, away from itself. For example, the Talbot element 130 may include an aperture array and the Talbot image may be an array of focal spots. If the Talbot element 130 is laterally periodic in both lateral directions, the array of focal spots is a two-dimensional array of focal spots. The geometry of the array of focal spots may correspond to the periodic pattern in the Talbot element 130. For example, the distance between the focal spots, pitch p, may correspond to the period, d, of the periodic pattern of the Talbot element 130. As another example, the shape and size of the focal spots may correspond to the shape and size of elements (e.g., apertures) in the periodic pattern of a Talbot element 130. In embodiments, the Talbot element 130 may be designed so that the pitch, p, distance between focal spots, is larger than the size (e.g., pixel size) of the light detecting elements 152 (as shown in FIG. 5) in the light detector 150. With this design, each light detecting element 152 (as shown in FIG. 5) corresponds to a single focal spot and the intensity (e.g., emission intensity) from each focus point can be differentiated. In embodiments, the pitch, p, between the focal spots is equal to the period, d, of the periodic pattern of the Talbot element 130.

In embodiments, the phase gradient generating device 120 may change, over time during an image acquisition process, the phase gradient of the light field incident the Talbot element 130. A small linear phase gradient change at the Talbot element 130 may induce a relatively large lateral translational shift of the Talbot image. By changing the phase gradient over time, the phase gradient generating device 120 can scan the Talbot image (e.g., array of focal spots) located at a plane that is at a distance of an integer multiple of a half Talbot distance ($l_{t\_2}$), $nl_{t\_2}$, from the Talbot element 130. During scanning, an object being imaged is located at the plane at the distance, $nl_{t\_2}$, from the Talbot element 130. During scanning, the phase gradient generating device 120 may change the phase gradient over time to scan the Talbot image over the object located at the plane at a distance, $nl_{t\_2}$, from the Talbot element 130. The phase gradient generating device 120 may change the phase gradient in one direction to scan the Talbot image in a single lateral direction of the plane, or change the phase gradient in two orthogonal directions to achieve a full field scan the Talbot image in both lateral directions of the plane. In one embodiment, the phase gradient generating device 120 may achieve a full field scan of the object by sweeping the phase gradient from 0 to k in two orthogonal directions to scan an Talbot image from 0 to $nl_{t\_2} \times k$ in both X and Y lateral directions of the plane at a distance of $nl_{t\_2}$ from the Talbot element 130. The scanned distance, $nl_{t\_2} \times k$ in each X and Y direction, may be designed to be at least the distance between the focal spots, or period, d, of the pattern in the Talbot element 130.

A collection element 140 can refer to any suitable structure(s), device(s) or combination thereof capable of collecting or otherwise differentiating the light of interest (e.g., emissions) as may be light altered and unaltered by the object. Some examples of structures/devices include suitable lenses that can collect scattered light, filters, phase structures that can detect phase change, and polarizers that can detect the polarization change. Some examples of suitable filters include wavelength filters capable of differentiating the wavelength such as fluorescence, Phosphorescence, second harmonic generation, two-photon induced photoluminescence filters.

In embodiments, the collection element 140 includes a filter for passing emissions from excited fluorophores in the object and rejecting (e.g., reflecting or absorbing) excitation light from the Talbot image (e.g., array of focal spots). In these cases, the Ti system 10 may be capable of fluorescence imaging.

A light detector 150 can refer to a suitable device or combination of devices capable of receiving light, measuring/recording light data associated with the light received, and generating one or more signals with light data. The one or more signals with light data may be in the form of an electrical current from the photoelectric effect. In some cases, the light detector 150 may be in the form of a one-dimensional linear array of a two-dimensional array of discrete light detecting elements 152 (shown in FIG. 5) of any suitable size (e.g., 1-10 microns) and any suitable shape (e.g., circular, rectangular, square, etc.). Some examples of suitable devices include a complementary metal oxide semiconductor (CMOS) imaging sensor array, a charge coupled device (CCD), electron multiplying charge coupled device (EMCCD), an avalanche photo-diode (APD) array, a photomultiplier tubes (PMT) array, and a photo-diode (PD) array. These light detectors 160 and others are commercially available. The light detector 150 can be a monochromatic detector or a multi-color detector (e.g., RGB detector).

Time varying light data can refer to any suitable information related to the light received and measured by the light detector 150. If the light detector 150 is the form of multiple discrete light detecting elements 152 (as shown in FIG. 5), the time varying light data may include suitable information related to the light received and measured by the multiple discrete light detecting elements 152 (as shown in FIG. 5) on a time varying basis. In some cases, each light detecting element 152 (as shown in FIG. 5) can generate a signal with time-varying light data based on light received and measured by the light detecting element 152 (as shown in FIG. 5). Time-varying light data may include, for example, properties of the light received such as the intensity(ies) of the light, the wavelength(s) of the light, the frequency or frequencies of the light, the polarization(s) of the light, the phase(s) of the light, the spin angular momentum(s) of the light, and/or other light properties associated with the light received by the light detector 150 and/or each light detecting element 152 (as shown in FIG. 5). Time varying light data may also include the location of the light detecting element(s) 152 (as shown in FIG. 5) receiving the light, the time that the light was received, or other information related to the light received.

An object 300 (shown in FIG. 2) being examined by the Ti system 10 can refer to any suitable entity, such as a biological or inorganic entity. Examples of suitable biological entities include cells, cell components (e.g., proteins, nuclei, etc.), microorganisms such as bacteria or viruses, etc. Although a single object 300 is shown in illustrated embodiments, in other embodiments any suitable number (e.g., 1, 2, 10, 100, 1000, etc.) of objects 300 may be examined by the Ti system 10. For example, FIG. 3 shows a Ti system 10 examining three objects 300.

In fluorescence imaging embodiments, a fluorescence/phosphorescence dye may be mixed with a specimen having the object 300 being imaged in order to mark or tag portions (e.g., nucleus) of the object 300 (e.g., cell) under investigation with fluorophore(s). A fluorophore can refer to a component of a molecule that causes the molecule to fluorescence or phosphorescence once excited. A fluorophore can absorb energy from excitation light of a specific wavelength(s) and re-emit the energy at a different wavelength(s).

A computing device 200 can refer to any suitable combination of devices capable of performing computing and controlling functions of the Ti system 10 such as reading out the collected signal(s) from the light detector 150, synchronizing the functions of different components of the Ti system 10, reconstructing an image of an object, etc. Some examples of suitable computing devices include a personal computer (desktop, laptop, etc.), a mobile communications device (e.g., smartphone or tablet), or other suitable device. In FIG. 1, the Ti system 10 includes the computing device 200. Alternatively, the computing device 200 can be a separate device from the Ti system 10.

A processor 210 can refer to any suitable processing device (e.g., microprocessor) or devices that can execute code stored on the CRM 220 (e.g., memory) to perform one or more functions of the Ti system 10. For example, the CRM 220 may include code for: c) code for interpreting light data received in one or more signals from the light detector 150, d) code for constructing one or more images of an object from the light data, f) code for displaying images on the display 230, g) and/or any other suitable code for performing functions of the Ti system 10. The CRM 220 may also include code for performing any of the signal processing or other software-related functions that may be created by those of ordinary skill in the art. The code may be in any suitable programming language including C, C++, Pascal, etc. The processor 210 may be in any suitable location. In FIG. 1, the processor 210 is located in the computing device 200. In another embodiment, the processor 210 may be located in the light detector 150.

The display 230 can refer to an suitable device for displaying reconstructed images, light data, and other suitable data. Some examples of suitable displays include a computer monitor, cell phone panel, projection, etc. Suitable displays are commercially available. The display 230 may be a monochromatic or multi-color display. Also, the display may be a two-dimensional or three-dimensional display, etc. In one case, the image display 230 may be capable of displaying multiple views.

The Ti system 10 may have many different configurations. Three exemplary configurations are described below.

A. First Configuration

FIG. 2 is a side view of components and partial components of a Ti system 10 of a first configuration, according to embodiments of the invention. The Ti system 10 of the first configuration may be used for bright field and/or fluorescence imaging. The Ti system 10 of the first configuration may be fabricated on a chip. The Ti system 10 of the first configuration includes a Ti device 100 and a computing device 200 (as shown in FIG. 1) in communication with the Ti device 100.

In FIG. 2, the Ti device 100 includes a light source 110 providing coherent light 112, a phase gradient generating device 120, and a portion of a Talbot element 130. The Ti device 100 also includes a collection element 140 with a filter for passing emission light and rejecting (e.g., reflecting/absorbing) excitation light, a light detector 150 for receiving/measuring light data, and a specimen surface 160 for receiving an object 300 being imaged by the Ti system 10.

The phase gradient generating device 120 includes a two-axis MEMS mirror 121, a quarter-wave plate 123, and a polarization sensitive beam splitter 124. The light source 110 provides coherent light 112 in the form of a collimated linear polarized beam incident on the polarization sensitive beam splitter 124. The polarization sensitive beam splitter 124 reflects the collimated linear polarized beam to a quarter-wave plate 123. The linear polarized beam is then transformed to a clockwise (or counter clockwise) circular polarized beam by the quarter-wave plate 123. The circular polarized beam is reflected from the MEMS mirror 121 and changes to a counter clockwise (or clockwise) circular polarized beam. After passing the quarter-wave plate 123 again, the polarization of the beam is transformed back to linear but its direction is perpendicular to the original direction. With this polarization change, the light will then pass the polarization sensitive beam splitter 124 and provide the incident light field to the Talbot element 130. Suitable two-axis MEMS mirrors 121, a quarter-wave plates 123, and polarization sensitive beam splitters 124 are commercially available.

In FIG. 2, the two-axis MEMS mirror 121 includes an outer surface 121(a), and a x'-axis and y'-axis (not shown). The x'-axis and y'-axis lie in a plane at the outer surface 121(a) of the two-axis MEMS mirror 121. The two-axis MEMS mirror 121 also includes a mechanical tilt angle, $\beta_{x'}$ (not shown) in the x'-tilt direction and a mechanical tilt angle, $\beta_{y'}$, 121(b) in the y'-tilt direction. Changing the mechanical tilt angles, $\beta_{x'}$ and $\beta_{y'}$, of the two-axis MEMS mirror 121 induces a respective change in the optical tilt angles, $\theta_x$ and $\theta_y$, of the incident field to the Talbot element 130. A change in the optical tilt angles, $\theta_x$ and $\theta_y$, induces a respective change of the phase gradient $k_x$ and $k_y$, of the incident field to the Talbot element 130. The relationships can be described as follows:

$$\theta_x = 2 \times \beta_x \qquad \text{(Eqn. 1a)}$$

$$\theta_y = 2 \times \beta_y \qquad \text{(Eqn. 1b)}$$

$$k_x = \tan \theta_x = \tan(2\beta_x) \qquad \text{(Eqn. 1c)}$$

$$k_y = \tan \theta_y = \tan(2\beta_y) \qquad \text{(Eqn. 1d)}$$

Although the MEMS mirror 121 in the illustrated example is a two-axis MEMS mirror 121, in other embodiments, the MEMS mirror may be a single axis MEMS mirror 121.

The Ti device 100 includes a Talbot element 130 with a two-dimensional microlens array 132 and an aperture layer 133 having a two-dimensional aperture array 134 aligned with the two-dimensional microlens array 132. FIG. 2 illustrates a portion of the Talbot element 130 of the Ti device 100. The entire Talbot element 130 includes a microlens array 132 and aperture array 134 that may have dimensions of any suitable size (e.g., 30×30, 100×100, 200×200, 100×300, 200×400, 400×400 etc.). In other embodiments, the microlens array 132 and aperture array 134 may be one-dimensional micro-cylindrical arrays or one-dimensional slots array having dimensions of suitable sizes (e.g., 100×1, 200×1, 300×1, etc.).

The portion of the Talbot element 130 shown in FIG. 2 includes a portion of the entire two-dimensional microlens array 132 of the Talbot element 130. The portion includes a two-dimensional array with dimensions having a size of 5×5, and having 25 microlenses 132(a) in two orthogonal directions. The portion of the Talbot element 130 shown in FIG. 2 also includes a portion of the two-dimensional aperture array 134 of the entire Talbot element 130. The portion includes a two-dimensional array with dimensions having a size of 5×5, and having 25 apertures 134(a) in two orthogonal directions.

The two-dimensional microlens array 132 focuses (i.e. condenses) the light from the phase gradient generating device 120 onto the apertures 134(a) of the two-dimensional aperture array 134. Focusing the light onto the apertures 134(a) may increase the efficiency of the Talbot element 130 in some cases.

The aperture layer 133 includes a two-dimensional aperture array 134 and an outer surface 133(a). The apertures 134(a) of the two-dimensional aperture array 134 have a uniform circular shape and a uniform diameter of 0.6 micron. In other embodiments, the apertures 134(a) may have other suitable shapes and sizes (e.g., 0.2 micron, 0.5 micron, 1 micron, 2 microns, etc.). The aperture size may affect focus quality in some cases.

The two-dimensional microlens array 132 has a uniform period, $d_1$, and the two-dimensional aperture array 134, has a period, $d_2$, that matches the period of two-dimensional microlens array 132. In the illustrated example, the Talbot element 130 has a period, d, of 30 microns, which corresponds to the matching periods of the two-dimensional microlens array 132 and the two-dimensional aperture array 134. That is, in this example, $d=d_1=d_2=30$ microns. In other embodiments, the period of the Talbot element 130, d, may have other suitable values such as 5 microns, 15 microns, 100 microns, etc.

In the illustrated example, an intensity pattern (Talbot image) of an array of focal spots 135 is repeated at a plane 136 at a distance, L, from the outer surface 133(a) of the aperture layer 133. In the example, the distance, L, is an integer multiple of a half Talbot distance $(l_{t\_2})$, $nl_{t\_2}$, from the outer surface 133(a) of the aperture layer 133. n can be any suitable integer value (1, 2, 3, 4, etc.). The half Talbot distance, $l_{t\_2}$, can be calculated as $d^2/\lambda$, where $\lambda$ is the wavelength of the incident light field at the Talbot element 130. In the example, the array of focal spots 135 is a two-dimensional array with dimensions of 5×5 and with 25 focal spots 135(a). The array of focal spots 135 includes an X-axis and Y-axis (not shown). The X-axis and Y-axis lie in the plane 136 at a distance, L, from the outer surface 133(a) of the aperture layer 133. Although the focal spots 135(a) are illustrated in the form of a circular spot, the focal spots 135(a) may be of any suitable form.

During the image acquisition process, the two-axis MEMS mirror 121 can change the phase gradient incident on the Talbot element 130 over time and in both directions by changing the mechanical tilt angles: $\beta_y$ and $\beta_y$ 121(b). Tilting the two-axis MEMS mirror 121 induces a change of the optical tilt angles $\theta_x$ and $\theta_y$, which induces a phase gradient change, $k_x$ and $k_y$, at the Talbot element 130. The phase gradient change at the Talbot element 130 induces a translational movement of the array of focal spots 135, which is the Talbot image of the aperture array 134. A small linear phase gradient change at the Talbot element 130 may induce a relatively large lateral translational shift of the Talbot image of the array of focal spots 135. The translational shift in the X-direction can be calculated as $\Delta X = L_n \times \tan(\theta_x) \approx L_n \times \theta_x = L_n \times 2 \times \beta_x$, where $\theta_x$ is the optical tilt angle in the x'-tilt direction and $L_n$ is the integer multiple of the half Talbot distance, $L_n = n\lambda^2/d$, (n is integer). The translational shift in the Y-direction can be calculated as $\Delta Y = L_n \times \tan(\theta_y) \approx L_n \times \theta_y = L_n \times 2 \times \beta_y$, where $\theta_y$ is the optical tilt angle in the y'-tilt direction. To move the array of focal spots 135 by a distance of one period, d, of the Talbot element 130 in either direction, the phase gradient change needs to be $k=\lambda/(nd)$, corresponding to the MEMS mirror 121 mechanical tilt angle of $\beta = a\tan(k)/2 \approx \lambda/(2 \times nd)$. In order to achieve a full field scan of the array of focal spots 135 in both lateral directions X and Y at the plane 136, the MEMS mirror 121 may change the mechanical tilt angles, $\beta_y$ and $\beta_x$, by at least $\lambda/(2 \times nd)$. For example, to full field scan the array of focal spots 135 at a plane 136 at a Talbot distance (n=2), if the distance between the microlens $d_1=30$ microns and the wavelength of the incident light $\lambda=488$ nm, then the mechanical tilt angle $\beta$ of the MEMS mirror 121 in each direction only needs to be: $\beta=488$ nm/$(2\times2\times30$ um$)$rad=0.0041 rad=0.23 degree.

In FIG. 2, the Ti device 100 also includes a collection element 140 and a light detector 150. The light detector 150 is in the form of a layer having an imaging sensor (e.g., a CMOS imaging sensor). The collection element 140 is in the form of a layer (e.g., coating) of a fluorescence filter material over the light detector 150. The fluorescence filter material can reject (e.g., absorb, reflect, etc.) excitation wavelength and transmit emission wavelength.

In FIG. 2, the specimen surface 160 is an outer surface of the collection element 140 in the illustrated example. In other embodiments, the specimen surface 160 may be a surface of a transparent layer located over the light detector 150 or may be another suitable surface. In some cases, the specimen surface 160 may be located so that an object 300 being imaged can be located on the specimen surface 160 and lie at the plane 136 at an integer multiple of a half Talbot distance $(l_{t\_2})$, $nl_{t\_2}$, from the outer surface 133(a).

In FIG. 2, an object 300 (e.g., cell) being imaged by the Ti system 10 is located on the specimen surface 160 and at the plane 136 of the array of focal spots 135 at a distance, L, from the outer surface 133(a). In the illustrated example, the distance, $L_n$, may be an integer multiple of a half Talbot distance $(l_{t\_2})$, $nl_{t\_2}$, where n can be any suitable integer value (1, 2, 3, 4, etc.). Although a single object 300 is shown, any suitable number of objects 300 may be imaged by the Ti system 10 of embodiments.

In an exemplary fluorescence imaging operation of the Ti system 10 of FIG. 2, an object 300 with activated fluorophores is provided on the specimen surface 160 so that the plane 136 lies through a portion of the object 300. The fluorophores may have been activated in a separate operation using a dye that marks or tags portions of the object 300 (e.g., cell nucleus) under investigation with fluorophore(s). The plane 136 is located at a distance of an integer multiple of a half Talbot distance, $nl_{t\_2}$ (n=1, 2, 3, etc.) away from the Talbot element 130. The processor 210 (shown in FIG. 1) sends a first trigger signal to the phase gradient generating device 120 to start phase generating and a second trigger signal to the light detector 150 to start image acquisition. The light source 110 provides coherent light 112 in the form of a collimated linear polarized beam incident on the polarization sensitive beam splitter 124 in response to receiving a start signal from the phase gradient generating device 120 or other component of the Ti system 10, or from being initiated by a user of the Ti system 10.

In response to receiving the first trigger signal, the MEMS mirror 121 of the phase gradient generating device 120 begins incrementally changing the mechanical tilt angles, $\beta_x$ and $\beta_y$, in the x'-direction and/or y' direction over time to scan the array of focal spots 135. Any suitable increments, $\beta_i$, can be used to increase/decrease the mechanical tilt angles. In some cases, the increments used may be selected based on the resolution desired or based on the desired image acquisition speed. In one case, to maximally exploit the resolution limited by the sharpness of Talbot focal spot 135(a), the mechanical tilt angle increment $\beta_i = \Delta/2L_n$ is used, where $\Delta$ is the full-width-at-half-maximum of Talbot focal spot 135(a). In another case, a finer increment $\beta_i < \Delta/2L_n$ can be applied, but the image resolution may not be improved. In another case, coarser increments can be used to increase image acquisition speed.

As the array of focal spots 135 is scanned over the object 300, the focal spots 136 provide excitation light of specific wavelength(s) at the location of the focal spots 135(a). Focal spots 135(a) can locally excite activated fluorophores in the object 300 at the location of the focal spots 135(a). In response to receiving the excitation light, the activated fluorophores at the location of the focal spots 135(a) re-emit light at a different wavelength(s). The collection element 140 receives the excitation light and emissions from the excited fluorophores. The collection element 140 rejects (e.g., absorbs, reflects, etc.) the excitation light and passes the emissions to the light detector 150. As the array of focal spots 135 is scanned at the plane 136, the light detector 150 receives the emissions passed by the collection element 140 and records time varying light data (e.g., intensity data) of the emissions. The time varying data collected corresponds the emissions collected based on the locally activated fluorophores at the locations of the individual focal spots 135(a). Since the fluorophores are activated locally at the location of the scanning focal spots 135(a), the resolution of the Ti system 10 may be based on the focus quality of the Talbot image (i.e., the array of focal spots 135) and not on the pixel size of the imaging sensor used. While changing the phase gradient of the beam, the fluorescence intensity of individual focal spots 135(a) on the light detector 150 is locally collected. The intensity information associated with the foci positions can be used to form a two-dimensional image. The size (e.g., pixel size) of the light detecting element 152 (as shown in FIG. 5) of the light detector 150 (e.g., CMOS imaging sensor) should be smaller than the distance between the focal spots 135(a) in the array so that the emission intensity from different focal spots 135 (a) can be differentiated.

After the light detector 150 completes the acquisition cycle, it sends a handshake signal to the processor 210. The processor 210 sends a stop signal to the phase gradient generating device 120 and the phase gradient generating device 120 stops phase generating. The processor 210 receives a signal or signals with the time varying light data from the image sensor 150 and constructs one or more bright field and/or fluorescence images of the object 300 based on the time varying light data and other data received. The processor 210 can display the one or more images on the display 230.

In one embodiment, the filter layer 140 may be omitted or the filter layer 140 may not reject the wavelength of the incident light to the Talbot element 130. In this embodiment, the Ti system 10 of the first configuration can be used for bright field imaging.

B. Configuration 2

FIG. 3 is a side view of components and partial components of a Ti system 10 of a second configuration, according to embodiments of the invention. The Ti system 10 of the illustrated example may be used for bright field imaging and/or may be fabricated on a chip. In FIG. 3, the Ti system 10 of the second configuration includes a Ti device 100 and a computing device 200 (shown in FIG. 1) in communication with the Ti device 100.

In FIG. 3, the Ti device 100 includes a light source 110 providing coherent light 112, a phase gradient generating device 120, and a Talbot element 130. The light source 110 provides coherent light 112 in the form of a collimated linear polarized beam incident on the phase gradient generating device 120. The phase gradient generating device 120 is in the form of a liquid crystal beam deflector. Any suitable liquid crystal beam deflector can be used. Some examples of suitable liquid crystal beam deflectors include a liquid crystal wedge and a liquid crystal blazed grating. Although the phase gradient generating device 120 is shown located proximal the Talbot element 130, in other embodiments, a transparent layer (e.g., microlens array layer) may lie between the Talbot element 130 and the phase gradient generating device 120.

The Ti device 100 includes a Talbot element 130 includes an aperture layer 133 having a two-dimensional aperture array 134 and an outer surface 133(a). FIG. 3 illustrates a portion of the Talbot element 130. The entire Talbot element 130 is a two-dimensional aperture array 134 having dimensions of any suitable size any suitable size (e.g., 30×30, 100× 100, 200×200, 100×300, 200×400, 400×400 etc.). In other embodiments, the aperture array 134 may be one-dimensional arrays having dimensions of suitable sizes (e.g., 100×1, 200×1, 300×1, etc.). The illustrated portion of the Talbot element 130 includes a two dimensional array having dimensions with a size of 5×5, and includes 25 apertures 134(a) (shown in FIG. 2).

The two-dimensional aperture array 134 of the Talbot element 130 includes apertures 134(a) (as (shown in FIG. 2) with a uniform circular shape and a uniform diameter of 0.6 micron. In other embodiments, the apertures 134(a) may have other suitable shapes and sizes (e.g., 0.2 micron, 0.5 micron, 1 micron, 2 microns, etc.). The aperture size may affect focus quality in some cases.

In FIG. 3, the Talbot element 130 has a period, d, which corresponds to the period of the two-dimensional aperture array 134. The period, d, may be any suitable value (e.g., 5 microns, 15 microns, 30 microns, 100 microns, etc.).

In the illustrated example, an intensity pattern (Talbot image) of an array of focal spots 135 is generated at a plane 136 at a distance, L, from the outer surface 133(a) of the aperture layer 133. The distance, L, is an integer multiple of a half Talbot distance ($l_{t\_2}$), $nl_{t\_2}$, from the outer surface 133(a) of the aperture layer 133. n can be any suitable integer value (1, 2, 3, 4, etc.). The half Talbot distance, $l_{t\_2}$, can be calculated as $d^2/\lambda$, where $\lambda$ is the wavelength of the incident light field at the Talbot element 130. In this example, the array of focal spots 135 is a two-dimensional array with dimensions of 5×5 and with 25 focal spots 135(a). The array of focal spots 135 includes an X-axis and Y-axis (not shown). The X-axis and Y-axis lie in the plane 136 at a distance, L, from the outer surface 133(a) of the aperture layer 133. Although the focal spots 135(a) are illustrated in the form of a circular spot, the focal spots 135(a) may be of any suitable form.

In FIG. 3, the Ti device 100 also includes a light detector 150 for receiving/measuring light data, and a specimen surface 160 for receiving objects 300 being imaged by the Ti system 10. The light detector 150 is in the form of an imaging sensor (e.g., a CMOS imaging sensor). The specimen surface 160 is the outer surface of the light detector 150 in the illustrated example. In other embodiments, the specimen surface 160 may be a surface of a transparent layer (e.g., protective layer) or a filter layer 150 (shown in FIG. 2) located over the light detector 150 or may be another suitable surface. In some cases, the specimen surface 160 or Talbot element 130 may be adjusted (e.g., relocated) so that an object 300 being imaged can be at the plane 136 at an integer multiple of a half Talbot distance ($l_{t\_2}$), $nl_{t\_2}$, from the outer surface 133(a).

In FIG. 3, three objects 300 (e.g., cells) being imaged by the Ti system 10 are located on the specimen surface 160 and at the plane 136 of the array of focal spots 135 at a distance, L, from the outer surface 133(a). The distance, L, is an integer multiple of a half Talbot distance ($l_{t\_2}$), $l_{t\_2}$, where n can be any suitable integer value (1, 2, 3, 4, etc.). Although three objects 300 are shown, any suitable number (e.g., 1, 2, 3, 4, 10, 20, 100) of objects 300 may be imaged by the Ti system 10 of embodiments.

In this second configuration illustrated in FIG. 3, the liquid crystal beam deflector controls the phase gradient of the incident beam to the Talbot element 130. By deflecting the incident beam through liquid crystal beam deflector, the two-dimensional array of focal spots 135 of the Talbot image can be scanned over the objects 300 being imaged. If a focal spot 135(a) moves to a location during scanning where an object 300 is scatterous or absorptive, the light will be altered and the intensity readout of the light detecting elements 152 (as shown in FIG. 5) in the light detector 150 underneath the focal spot 135(a) will decrease. Without a collection element 140, a bright field image can be constructed by the Ti system 10 in FIG. 3. If a collection element 140 comprising a filter layer is placed between the specimen surface 160 and the light detector 150 in the Ti device 100 in FIG. 3, the Ti system 10 of the second configuration can be used for fluorescence imaging as well.

In an exemplary bright field imaging operation of the Ti system 10 of FIG. 3, objects 300 are provided on the specimen surface 160 so that the plane 136 lies through a portion of the objects 300. The plane 136 is located at a distance of an integer multiple of a half Talbot distance, $nl_{t\_2}$ (n=1, 2, 3, etc.) away from the Talbot element 130. The processor 210 (shown in FIG. 1) sends a first trigger signal to the phase gradient generating device 120 to start phase generating and a second trigger signal to the light detector 150 to start image acquisition. The light source 110 provides coherent light 112 in the form of a collimated linear polarized beam incident on the liquid crystal beam deflector in response to receiving a start signal from the phase gradient generating device 120 or other component of the Ti system 10, or from being initiated by a user of the Ti system 10.

In response to receiving the first trigger signal, liquid crystal beam deflector begins changing the phase gradient of the incident beam on the Talbot element 130. The liquid crystal beam deflector changes the phase gradient from 0 to k to scan the array of focal spots 135 from 0 to $nl_{t\_2} \times k$ in both the X and Y directions at the plane 136 over the objects 300.

As the array of focal spots 135 is scanned over the objects 300, the objects 300 alter the light from the scanning array of focal spots 135. As the array of focal spots 135 is scanned over the objects 300, the light detector 150 receives altered and unaltered light and records time varying light data (e.g., intensity data). After the light detector 150 completes the acquisition cycle, it sends a handshake signal to the processor 210. The processor 210 sends a stop signal to the phase gradient generating device 120 and the phase gradient generating device 120 stops phase generating. The processor 210 receives a signal or signals with the time varying light data from the light detector 150 and constructs one or more bright field images of the objects 150 based on the time varying light data. The processor 210 can display the one or more images on the display 230.

C. Configuration 3

FIG. 4 is a side view of components and partial components of a Ti system 10 of a third configuration, according to embodiments of the invention. The Ti system 10 of the illustrated example may be used for bright field and/or fluorescence imaging. The Ti system 10 of the illustrated example may be fabricated on a chip. In FIG. 4, the Ti system 10 of the third configuration includes a Ti device 100 and a computing device 200 (shown in FIG. 1) in communication with the Ti device 100.

In FIG. 4, the Ti device 100 includes a light source 110 providing coherent light 112 in the form of a collimated beam. In this configuration, the Ti device 100 also includes a micro-concave mirror array 126 mounted on a piezo tilt stage 125 that serves as both a phase gradient generating device 120 and a Talbot element 130. FIG. 4 illustrates a portion of the micro-concave mirror array 126. The Ti device 100 also includes a light detector 150 and a specimen surface 160 for receiving an object 300 being imaged by the Ti system 10. The Ti device 100 also includes a beam splitter 170 for reflecting the collimated beam from the light source 110 to the micro-concave mirror array 126. The micro-concave mirror array 126 focuses the light to repeat a Talbot image of an array of focal spots 135. Compared with a micro lens, a concave mirror has the advantage of being able to achieve a high numerical aperture, and thus a tighter focus, as described in Merenda, F., Rohner, J., Fournier, J. M. and Salath, R. P. "Miniaturized high-NA focusing-mirror multiple optical tweezers," Optics Express 15, 6075-6086 (2007), which is hereby incorporated by reference in its entirety for all purposes.

The micro-concave mirror array 126 includes an x'-axis and y'-axis (not shown). The x'-axis and y'-axis lie in a plane through the center of the foci of the micro-concave mirror array 126. The micro-concave mirror array 126 can be tilted by a mechanical tilt angle, $\beta_x$, (not shown) in the x'-tilt direction and a mechanical tilt angle, $\beta_y$, 121(b) in the y'-tilt direction 121(b). In the illustrated example, the piezo tilt stage 125 can tilt (rotate) the micro-concave mirror array 126 along the x'-axis and y'-axis to change the $\beta_x$ and $\beta_y$ respectively. In the illustrated example, the micro-concave mirror array 126 is mounted on a piezo tilt stage 125 that can be tilted around two axles to rotate the micro-concave mirror array 126 along the x'-axis and y'-axis to change the $\beta_x$ and $\beta_y$ respectively.

During an image acquisition process, the piezo tilt stage 125 can tilt the micro-concave mirror array 126 to change the phase gradient over time. Changing the mechanical tilt angles, $\beta_x$ and $\beta_y$, of the micro-concave mirror array 126 induces a respective change in the optical tilt angles, $\theta_x$ and $\theta_y$, of the incident field to the Talbot element 130. A change in the optical tilt angles, $\theta_x$ and $\theta_y$, induces a respective change of the phase gradient $k_x$ and $k_y$, of the incident field to the Talbot element 130. The relationships are described in Eqns. 1a, 1b, 1c, and 1d. The phase gradient change at the Talbot element 130 induces a translational movement of the array of focal spots 135. A translational shift in the X-direction can be calculated as $\Delta X = L_n \times \tan(\theta_x) \approx L_n \times \theta_x = L_n \times 2 \times \beta_x$, where $\theta_x$ is the optical tilt angle in the x'-tilt direction and $L_n$ is the integer multiple of the half Talbot distance, $L_n = n\lambda^2/d$, (n is integer). The translational shift in the Y-direction can be calculated as $\Delta Y = L_n \times \tan(\theta_y) \approx L_n \times \theta_y = L_n \times 2 \times \beta_y$, where $\theta_y$ is the optical tilt angle in the y'-tilt direction. To move the array of focal spots 135 by a distance of one period, d, of the Talbot element 130 in either direction, the phase gradient change needs to be $k=\lambda/(nd)$, corresponding the mechanical tilt angle of $\beta=a\tan(k)/2 \approx \lambda/(2 \times nd)$. In order to achieve a full field scan of the array of focal spots 135 in both lateral directions X and Y at the plane 136, the micro-concave mirror array 126 may change the mechanical tilt angles, $\beta_y$ and $\beta_x$, by at least $\lambda/(2 \times nd)$.

The Ti device 100 includes a micro-concave mirror array 126. The micro-concave mirror array 126 is a two-dimensional array having dimensions of any suitable size (e.g., 30×30, 100×100, 200×200, 100×300, 200×400, 400×400 etc.). In other embodiments, the micro-concave mirror array 126 may be one-dimensional array having dimensions of a suitable size (e.g., 100×1, 200×1, 300×1, etc.). FIG. 4 illustrates a portion of the entire micro-concave mirror array 126. The illustrated portion of the micro-concave mirror array 126 is a two-dimensional array with dimension of a size of 8×8, and having 64 micro concave mirrors 126(a).

Each micro-concave mirror 126(a) in the micro-concave mirror array 126 may have any properties (e.g., size, concavity, reflectivity, etc.) of any suitable value. In the illustrated example, the micro-concave mirror array 126 and associated Talbot element 130 have a period, d, of 30 microns. In other embodiments, the period of the Talbot element 130, d, may have other suitable values such as 5 microns, 15 microns, 100 microns, etc.

In FIG. 4, the light source 110 provides coherent light 112 incident the beam splitter 170. The beam splitter 170 reflects the beam to the micro-concave mirror array 126. The micro-concave mirror array 126 reflects and focuses the beam. The intensity pattern (Talbot image) of an array of focal spots 135 is generated at a distance, $L_n$, from a plane through the center of the foci of the micro-concave mirror array 126. In the example, the distance, $L_n$, is an integer multiple of a half Talbot distance ($l_{t\_2}$), $nl_{t\_2}$, from the micro-concave mirror array 126. n can be any suitable integer value (1, 2, 3, 4, etc.). The half Talbot distance, $l_{t\_2}$, can be calculated as $d^2/\lambda$, where 2 is the wavelength of the incident light field at the Talbot element 130.

FIG. 4 illustrates a portion of the array of focal spots 135 of a two-dimensional array with dimensions having a size of 5×5, with 25 focal spots 135(a). The entire array of focal spots 135 may have a dimensions of any suitable size (e.g., 30×30, 10×10, 30×10, 100×100 etc.). The array of focal spots 135 includes an X-axis and Y-axis (not shown). The X-axis and Y-axis lie in the plane 136 at a distance, $L_n$, from plane through the center of the foci of the micro-concave mirror array 126. Although the focal spots 135(a) are illustrated in the form of a circular spot, the focal spots 135(a) may be of any suitable form.

In FIG. 4, the Ti device 100 also includes a light detector 150 for receiving/measuring light data, and a specimen surface 160 for receiving an object 300 being imaged by the Ti system 10. The light detector 150 is in the form of a layer having an imaging sensor (e.g., a CMOS imaging sensor). The specimen surface 160 is an outer surface of the light detector 150 in the illustrated example. In other embodiments, the specimen surface 160 may be a surface of a transparent layer or a filter layer 150 (shown in FIG. 2) located over the light detector 150 or may be another suitable surface. In some cases, the specimen surface 160 may be located so that an object 300 being imaged can be located on the specimen surface 160 and lie at the plane 136 at an integer multiple of a half Talbot distance ($l_{t\_2}$), $nl_{t\_2}$ from the plane through the center of the foci of the micro-concave mirror array 126.

If a focal spot 135(a) moves to a location during scanning where the object 300 is scatterous or absorptive, the light will be altered and the intensity readout of the light detecting elements 152 (as shown in FIG. 5) in the light detector 150 underneath the focal spot 135(a) will decrease. Without a collection element 140 having a filter, a bright field image can be constructed by the Ti system 10 in FIG. 4. If a collection element 140 comprising a filter layer is placed between the specimen surface 160 and the light detector 150 in the Ti device 100 in FIG. 4, the Ti system 10 of the third configuration can be used for fluorescence imaging and/or brightfield imaging.

In FIG. 4, an object 300 (e.g., cell) being imaged by the Ti system 10 is located on the specimen surface 160 and at a plane 136 of the array of focal spots 135 at a distance, L, from the plane through the center of the foci of the micro-concave mirror array 126. In the illustrated example, the distance, L, may be an integer multiple of a half Talbot distance ($l_{t\_2}$), $nl_{t\_2}$, where n can be any suitable integer value (1, 2, 3, 4, etc.). Although a single object 300 is shown, any suitable number of objects 300 may be imaged by the Ti system 10 of embodiments.

In an exemplary imaging operation of the Ti system 10 of FIG. 4, an object 300 being imaged is provided on the specimen surface 160. The plane 136 lies through a portion of the object 300. The plane 136 is located at a distance of an integer multiple of a half Talbot distance, $nl_{t\_2}$ (n=1, 2, 3, etc.) away from the Talbot element 130. The processor 210 (shown in FIG. 1) sends a first trigger signal to the piezo tilt stage 125 to start phase generating and a second trigger signal to the light detector 150 to start image acquisition. The light source 110 provides coherent light 112 incident on the beam splitter 170 in response to receiving a start signal from the phase gradient generating device 120 or other component of the Ti system 10, or from being initiated by a user of the Ti system 10.

In response to receiving the first trigger signal, the piezo tilt stage 125 begins incrementally changing the mechanical tilt angles, $\beta_x$ and $\beta_y$, in the x'-direction and/or y' direction over time to scan the array of focal spots 135. Any suitable increments, $\beta_i$, can be used to increase/decrease the mechanical tilt angles. In some cases, the increments used may be selected based on the resolution desired or based on the desired image acquisition speed. In one case, to maximally exploit the resolution limited by the sharpness of Talbot focal spot 135(a), the mechanical tilt angle increment $\beta_i = \Delta/2L_n$ is used, where $\Delta$ is the full-width-at-half-maximum of Talbot focal spot 135(a). In another case, a finer increment $\beta_i\Delta/2L_n$ can be applied, but the image resolution may not be improved. In another case, coarser increments can be used to increase image acquisition speed.

As the array of focal spots 135 scans over the object 300, the object 300 alters the light from the scanning array of focal spots 135. As the array of focal spots 135 is scanned over the object 300, the light detector 150 receives altered and unaltered light and records time varying light data (e.g., intensity data). As the array of focal spots 135 is scanned over the object 300, the optical signal collected by the light detector 150 underneath the object 300 may include any suitable light data associated with the altered light such as scattering intensity, fluorescent intensity, polarization, etc. In one case, the Ti device 100 includes a collection element 140 between the specimen surface 160 and the light detector 150. The collection element 140 includes a polarizer. In this case, the optical signal includes the polarization change by the object 300.

After the light detector 150 completes the acquisition cycle, it sends a handshake signal to the processor 210. The processor 210 sends a stop signal to the piezo tilt stage 125 and the piezo tilt stage 125 stops phase generating. The processor 210 receives a signal or signals with the time varying light data from the light detector 150 and constructs one or more images of the objects 150 based on the time varying light data. The processor 210 can display the one or more images on the display 230.

Modifications, additions, or omissions may be made to the Ti device 100 and/or Ti system 10 of embodiments without departing from the scope of the disclosure. For example, a Ti device 100 and/or Ti system 10 of embodiments may omit the light source 110 as a component. Instead, the light source 110 may be a separate component form the Ti device 100 and/or Ti system 10. As another example, a Ti device 100 and/or Ti system 10 may omit or add a collection element 140.

In addition, components of the Ti device 100 and/or Ti system 10 of embodiments may be integrated or separated according to particular needs. For example, the processor 210 may be integrated into the light detector 150 so that the light detector 150 performs one or more of the functions of the processor 210 in another Ti system 10. As another example, the processor 210, CRM 220, and display 230 may be components of a computer separate from a Ti system 10 and in communication with the Ti system 10. As another example, the processor 210, second CRM 220, and/or display 230 may be integrated into components of the Ti device 100.

In some embodiments, the Ti device 100 and/or Ti system 10 may be added to other components to provide combined functionality. For example, the Ti device 100 and/or Ti system 10 may be combined with a microfluidic device to form an integrated imaging and diagnosis system. Some other examples may be combining the Ti device 100 and/or Ti system 10 with a micro-well array for single cell imaging, on-chip cell culture, microfluidic cell sorting, enzyme-linked immunosorbent assay (ELISA), etc.

II. Exemplary Readout and Reconstruction Methods

The light detector 150 of the Ti system 10 can use a data acquisition readout method to collect the light data (optical information) of interest on a time-varying basis from each scanning focal spot 135($a$) as it is scanned at a plane 136 over a scanning region of the light detector 150. The time-varying light data of interest is associated with light altered by an object 300 located at the plane 136. With a reconstruction method, the processor 210 of the Ti system 10 can use the time-varying light data to generate an image of the object 300. This section describes two exemplary readout and reconstruction methods that can be used by Ti systems 10 of embodiments. In the first example, the readout and reconstruction method is based on a direct readout mode. In the second example, the readout and reconstruction method is based on a monitored readout mode.

A. Direct Readout Mode

In a direct readout mode, the light detector 150 and the scanning range of the array of focal spot 135 are aligned so that each focal spot 135($a$) scans over a predefined scanning region 154 of the light detector 150. In this mode, the total scanning range of the array of focal spots 135 covers about the entire region of the light detector 150 being used to image the object 300. Since the predefined scanning regions 154 do not overlap with other, the readout from each predefined scanning region 154 directly corresponds to the light data (optical information) at each focal spot 135($a$). That is, the time varying light data measured by the light detecting elements 152 in each predefined scanning region 154 directly corresponds to the location and other properties of a single corresponding focal spot 135($a$). Each predefined scanning region 154 may include any suitable number (e.g., 1, 2, 4, 16, 64, etc.) of light detecting elements 152. Each predefined scanning regions 152 may be in the form of a one-dimensional or two-dimensional array of light detecting elements 152.

FIG. 5 is a sensor floor plan 400 used in a direct readout mode, according to an embodiment of the invention. A sensor floor plan 400 is a plan view diagram of a light detector 150 and corresponding focal spots 135($a$). The sensor floor plan 400 can define the readout correspondence between regions of the light detector 150 and the focal spots 135($a$).

In FIG. 5, the sensor floor plan 400 includes a light detector 150 of a Ti device 100 of an embodiment. The Ti device 100 can be of any configuration. The light detector 150 includes a two-dimensional array of light detecting elements 152. The two-dimensional array has dimensions of a size of 8×8, and includes 64 light detecting elements 152. In other embodiments, the light detector 150 may have dimensions of other suitable sizes (e.g., 100×1, 30×30, 100×300, 2048×1680 etc.). The sensor floor plan 400 also illustrates a two-dimensional array of focal spots 135 located over the light detector 150. The two-dimensional array has dimensions of a size of 2×2, and includes four focal spots 135($a$)(1), 135($a$)(2), 135($a$)(3), and 135($a$)(4). In other embodiments, the array of focal spots 135 may have dimensions of other suitable sizes.

The sensor floor plan 400 defines four predefined scanning regions 154(1), 154(2), 154(3), and 154(4) of the light detector 150, corresponding to the four focal spots 135($a$)(1), 135($a$)(2), 135($a$)(3), and 135($a$)(4), respectively. Each predefined scanning region includes a 4×4 two-dimensional array of light detecting elements 152.

Figure 6:
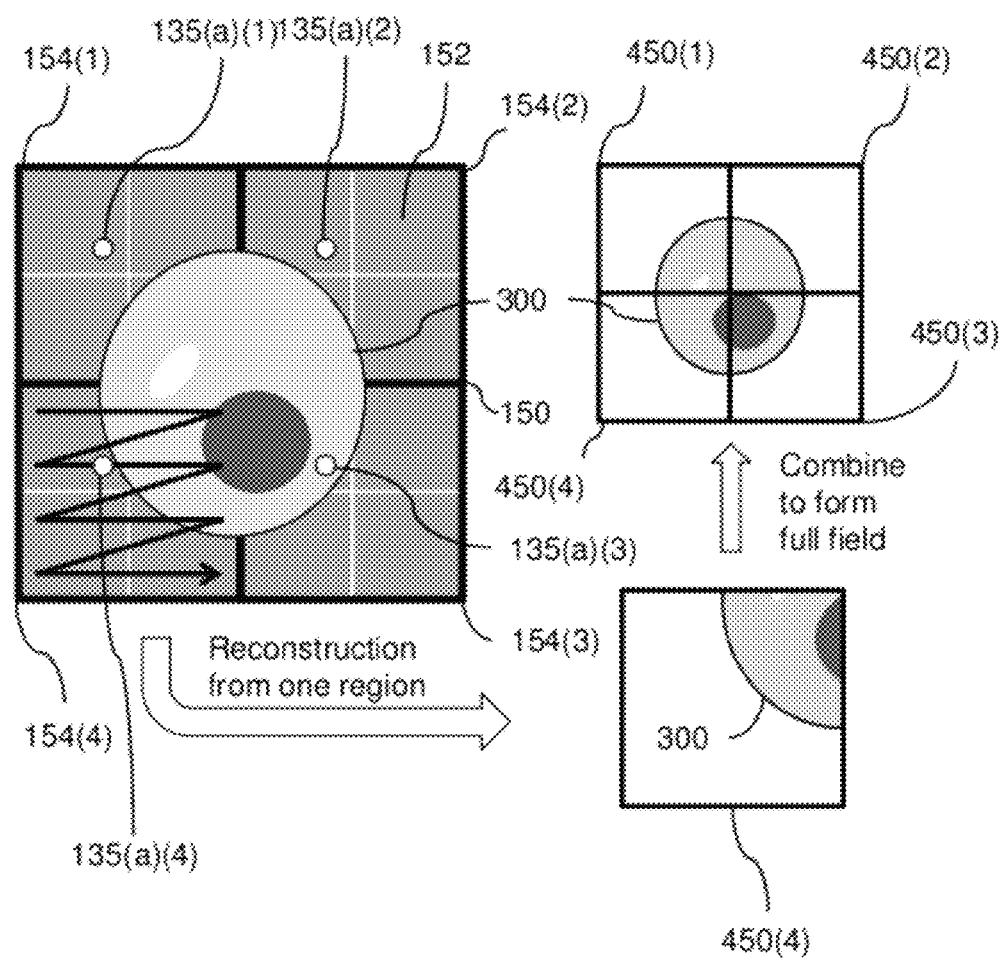
FIG. 6 is a reconstruction schematic used in a direct readout mode, according to an embodiment of the invention.

FIG. 6 is a reconstruction schematic used in a direct readout mode, according to an embodiment of the invention. In this schematic, the light detector 150 includes a two-dimensional array of light detecting elements 152. The two-dimensional array has dimensions of a size of 4×4, and includes 16 light detecting elements 152. In this schematic, the light detector 150 includes four predefined scanning regions 154(1), 154(2), 154(3), and 154(4) corresponding to the four focal spots 135($a$)(1), 135($a$)(2), 135($a$)(3), and 135($a$)(4), respectively. Each predefined scanning region includes a 2×2 two-dimensional array of light detecting elements 152.

In the schematic, the four focal spots 135($a$)(1), 135($a$)(2), 135($a$)(3), and 135($a$)(4) scan an object 300 on top of the four predefined scanning regions 154(1), 154(2), 154(3), and 154(4) of the light detector 150. As the focal spots 135($a$)(1), 135($a$)(2), 135($a$)(3), and 135($a$)(4) scan the object 300, the light detector 150 records a sequence (time varying light data) of intensity or other light property associated with the focal spots 135($a$) at each position of the focal spots 135($a$).

The processor 210 of the Ti system 10 uses the time varying light data at each position of the focal spot 135($a$) in each predefined scanning region 154 to reconstruct an image with the size equal to the predefined scanning region 154. The full field-of-view image is constructed by combining the images from all the predefined scanning regions 154

In an embodiment of the Ti system 10 in the direct readout mode, binning of the light detecting elements 152 (e.g., pixels) within a predefined scanning region 154 can be done to increase the readout speed of the light detector 150. Binning of the light detecting elements 152 may improve acquisition speed.

B. Monitored Readout Mode

In a monitored readout mode, the light detector 150 and the scanning range of the array of focal spots 135 do not need to be strictly aligned. In this mode, the light detector 150 includes a calibration region 155 for monitoring the location of the scanning focal spots 135($a$) during scanning. The calibration region 155 does not have an object 300 over it during acquisition. In some cases, a physical barrier may be located between the calibration region 155 and other region of the light detector 150. The calibration region 155 may include any suitable number (e.g., 1, 2, 4, 16, 64, etc.) of light detecting elements 152.

Figure 7:
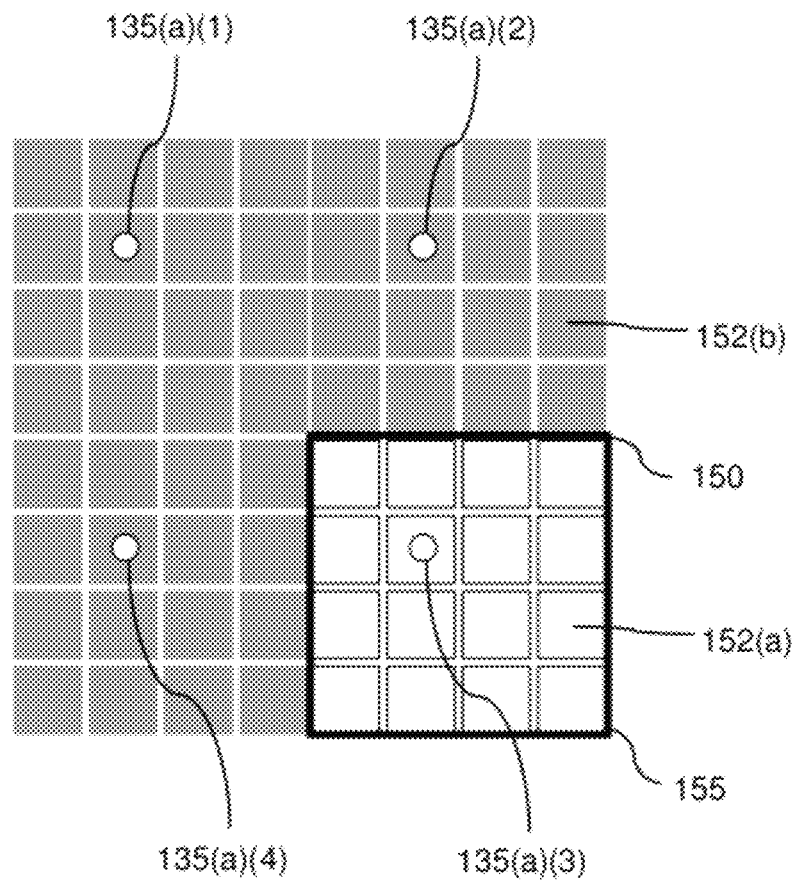
FIG. 7 is a sensor floor plan used in a monitored readout mode, according to an embodiment of the invention.

FIG. 7 is a sensor floor plan 400 used in a monitored readout mode, according to an embodiment of the invention. The sensor floor plan 400 can define the readout correspondence between light detecting elements 152 of the light detector 150 and the focal spots 135($a$).

In FIG. 5, the sensor floor plan 400 includes a light detector 150 of a Ti device 100 of an embodiment. The Ti device 100 can be of any configuration. The light detector 150 includes a two-dimensional array of light detecting elements 152. The two-dimensional array has dimensions of a size of 8×8, and includes 64 light detecting elements 152. In other embodiments, the light detector 150 may have dimensions of other suitable sizes (e.g., 100×1, 30×30, 100×300, 2048×1680 etc.). The sensor floor plan 400 also illustrates a two-dimensional array of focal spots 135 located over the light detector 150. The two-dimensional array has dimensions of a size of 2×2, and includes four focal spots 135(*a*)(1), 135(*a*)(2), 135(*a*)(3), and 135(*a*)(4). In other embodiments, the array of focal spots 135 may have dimensions of other suitable sizes.

The sensor floor plan 400 defines a calibration region 155 of the light detector 150 corresponding to the focal spot 135(*a*)(3). In the illustrated example, the calibration region 155 includes a two-dimensional array with dimensions of 4×4, and including 16 light detecting elements 152(*a*). The calibration region 155 does not have an object 300 over it during acquisition and does not have a collection element over it. The light detector 150 also includes a region of 48 light detecting elements 152(*b*) outside the calibration region 155.

Since the calibration region 155 is associated with the focal spot 135(*a*)(3) and there is known distance between the focal spots 135 in the array of focal spots 135, locations of all the other focal spots 135(*a*) in the array 135 can be calculated based on the location of the focal spot 135(*a*)(3). This readout mode does not require strict alignment between the Talbot element 130 and the light detector 150 and also allows overlap of the scanning regions of the different focal spots 135(*a*).

Figure 8:
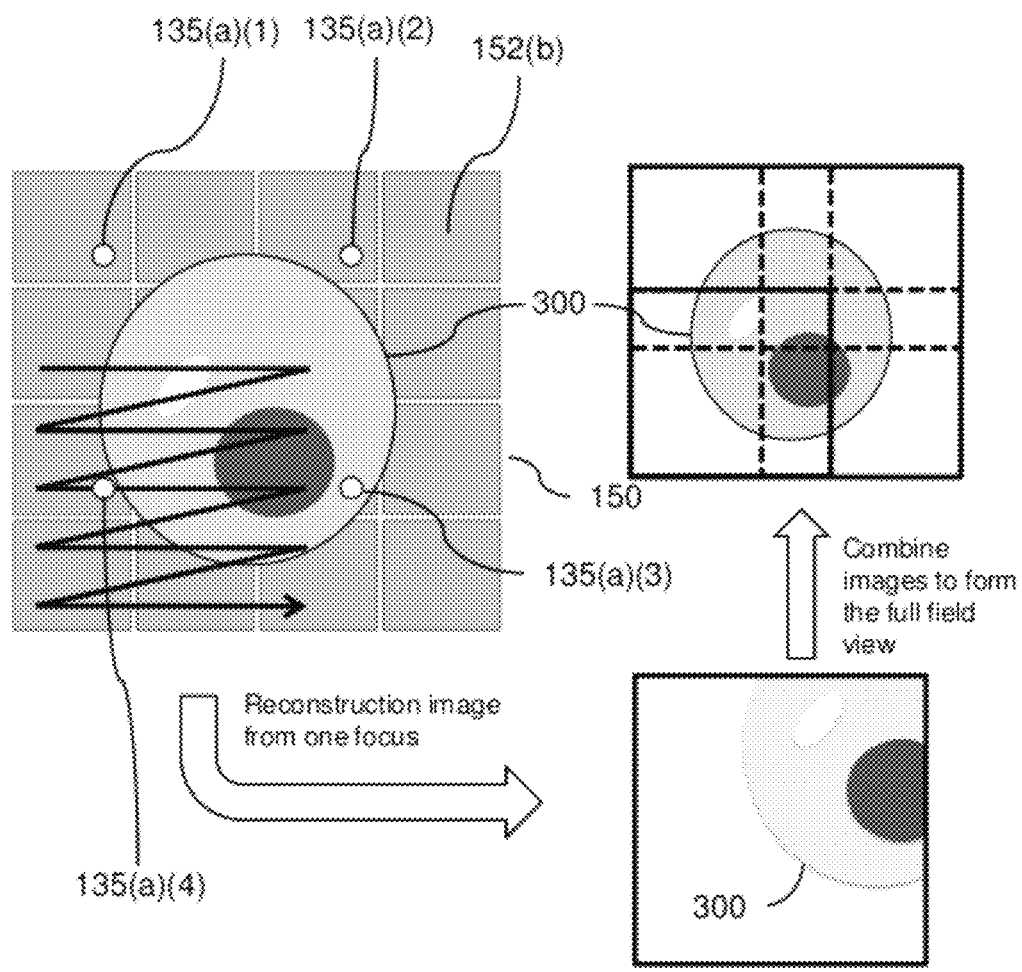
FIG. 8 is a reconstruction schematic used in a monitored readout mode, according to an embodiment of the invention.

FIG. 8 is a reconstruction schematic used in a monitored readout mode, according to an embodiment of the invention. In FIG. 8, a portion of the light detector 150 is shown that does not include the calibration region 155. The portion of the light detector 150 shown includes a two-dimensional array of light detecting elements 152(*b*) outside the calibration region 155. The two-dimensional array has dimensions of a size of 4×4, and includes 16 light detecting elements 152.

In the schematic, the four focal spots 135(*a*)(1), 135(*a*)(2), 135(*a*)(3), and 135(*a*)(4) scan an object 300 on top of light detector 150. The scanning regions scanned by neighboring focal spots 135(*a*) is overlapping in overlapping regions. The overlapping regions refer to regions illuminated by neighboring focal spots 135(*a*) more than once (multiple illuminations/scans) during an acquisition process. At each sample time during an acquisition process, the location of the focal spots 135(*a*) can be determined by the processor 210 based on the readout from the calibration region 155. At each sample time, the light detecting elements 152(*b*) in the region outside the calibration region 155 record a sequence (time varying light data) of intensity or other light property associated with the focal spots 135(*a*). At each sample time, only the readout from the light detecting elements 152(*b*) under the determined location of each focal spot 135(*a*) may be used by the processor 210 to generate an image of the scanned region in some cases. The processor 210 can reconstruct a full field-of-view image from the images of the scanned regions. The processor 210 may determine the overlapping region intensity by calculated the average intensity of each of the multiple scans by the different focal spots 135(*a*). That is, since the light detected in the overlapping regions is the sum of the intensities from the multiple illuminations, to make the intensity proportional to the intensity in the non-overlapping region, the processor 210 divides the intensity in the overlapping regions by the number of overlaps (i.e. number of scans/illuminations).

III. Flowchart

Figure 9:
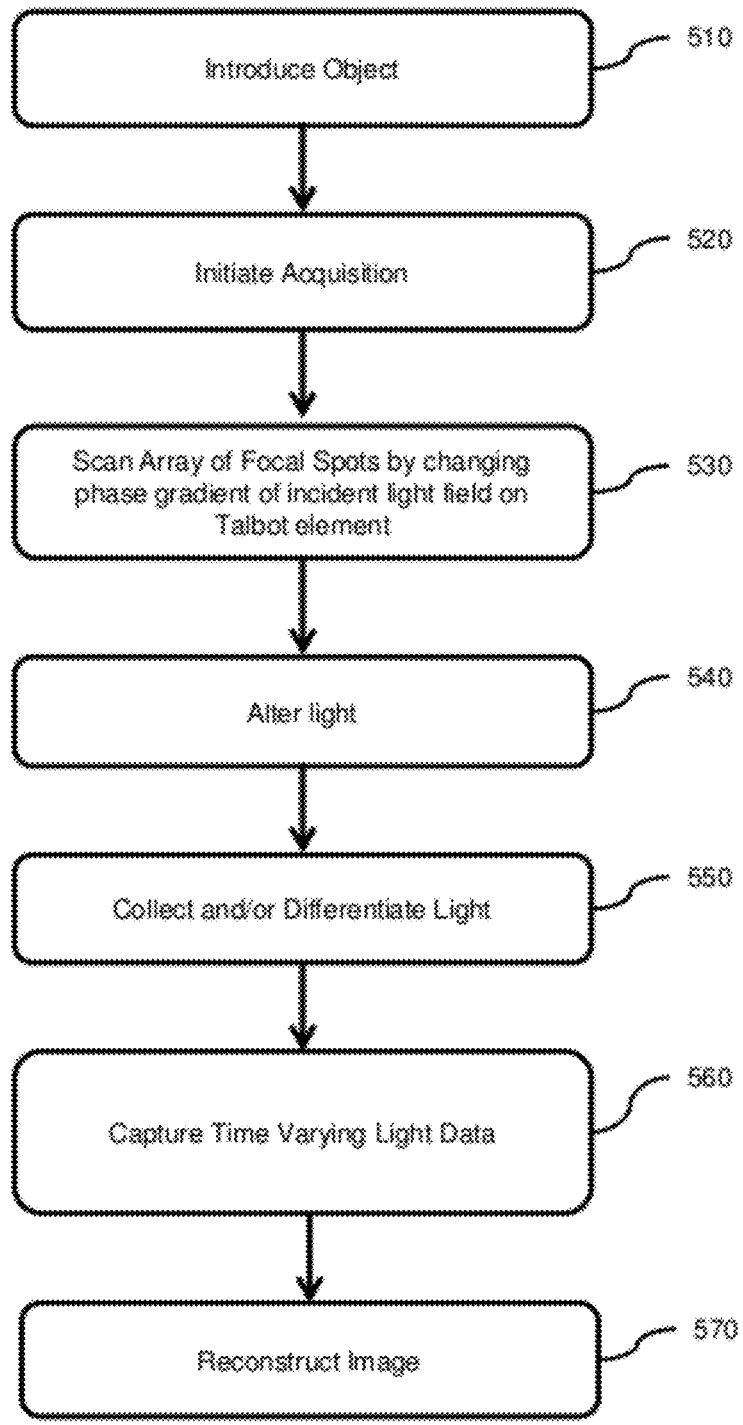
FIG. 9 is a flow chart of an exemplary method of operation of a Ti system, according to embodiments of the invention.

FIG. 9 is a flow chart of an exemplary method of operation of a Ti system 10, according to embodiments of the invention. The Ti system 10 can be of any configuration.

In step 510, the object 300 is introduced into the Ti device 100 onto the specimen surface 160 of the Ti device 100. The object 300 is located at a plane 136 that is at a distance, $L_n$, away from the Talbot element 130. $L_n$ is an integer multiple of a half Talbot distance: $nl_{t\_2}$, where n is an integer and $l_{t\_2}$ is the half Talbot distance. In the case of a square grid patterned Talbot element, $L_n = nd^2/\lambda$, where d is the period of the Talbot element 130 and $\lambda$ is the wavelength of the incident light on the Talbot element 130. The value of n depends on the location of the plane 136. For example, if the plane 136 is located at a Talbot distance ($l_t$) away from the Talbot element 130, then n=2.

In step 520, the acquisition process is initiated. The processor 210 sends a first trigger signal to the phase gradient generating device 120 to start phase generating and a second trigger signal to the light detector 150 to start image acquisition. At or before initiation of the acquisition process, the light source 100 begins providing a spatially coherent incident light 112 to the phase gradient generating device 120.

In step 530, the phase gradient generating device 120 incrementally changes the phase gradient of the light field incident a Talbot element 130 in order to scan the Talbot image (e.g., an array of focal spots 135) at the plane 136 over the object 300. For example, the phase gradient generating device 120 may sweep the phase gradient in two orthogonal directions to scan the Talbot image at the plane 136. Any suitable increments can be used. In order to achieve a full field scan of the Talbot image in both lateral directions X and Y at the plane 136, the phase gradient change in both directions must be $k=\lambda/(nd)$. In step 540, as the Talbot image is scanned over the object 300, the object 300 alters the light.

In step 550, the collection element 140 collects and/or differentiates the light of interest from the light received. For example, the collection element 140 may include a filter for passing emissions and rejecting excitation light. In this example, the Ti system 10 may be used for fluorescence imaging. As another example, the collection element 140 may include a polarizer. In this case, the optical signal Ti system 10 may be used for polarization imaging. In other embodiments, the Ti system 10 may not include a collection element 140. The light detector 140 receives the light of interest collected/differentiated by the collection element 140.

In step 560, the light detector 150 captures time varying light data as the Talbot image is scanned. After the light detector 150 completes the acquisition cycle, it sends a handshake signal to the processor 210. The processor 210 sends a stop signal to the phase gradient generating device 120 and the phase gradient generating device 120 stops phase generating.

In step 570, processor 210 receives a signal or signals with the time varying light data from the light detector 150 and constructs one or more images of the object 300. Either the direct readout mode or the monitored readout mode can be used to readout the time varying light data and construct the one or more images of the object 300. The processor 210 can display the one or more images on the display 230.

IV. Subsystems

Figure 10:
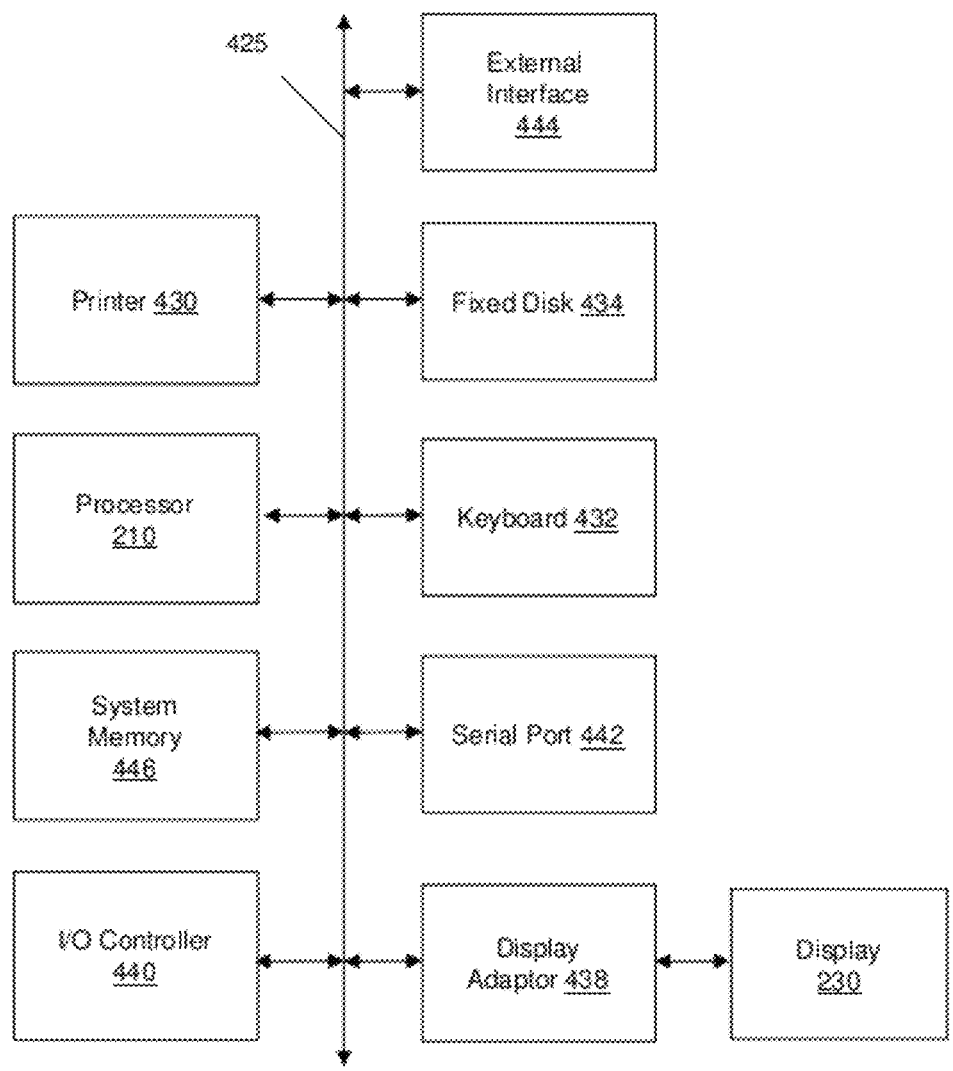
FIG. 10 is a block diagram of subsystems that may be present in the Ti system 10, according to embodiments of the invention.

FIG. 10 is a block diagram of subsystems that may be present in the Ti system 10, according to embodiments of the invention. For example, the Ti system 10 includes a processor 210. The processor 210 may be a component of the light detector 150 in some cases.

The various components previously described in the Figures may operate using one or more of the subsystems to facilitate the functions described herein. Any of the components in the Figures may use any suitable number of subsystems to facilitate the functions described herein. Examples of such subsystems and/or components are shown in a FIG. 10. The subsystems shown in FIG. 10 are interconnected via a system bus 425. Additional subsystems such as a printer 430, keyboard 432, fixed disk 434 (or other memory comprising computer readable media), display 230, which is coupled to display adapter 438, and others are shown. The display 230 may include the illuminating display 116 and/or the image display 230. Peripherals and input/output (I/O) devices, which couple to I/O controller 440, can be connected to the computer system by any number of means known in the art, such as serial port 442. For example, serial port 442 or external interface 444 can be used to connect the computer apparatus to a wide area network such as the Internet, a mouse input device, or a scanner. The interconnection via system bus allows the processor 210 to communicate with each subsystem and to control the execution of instructions from system memory 446 or the fixed disk 434, as well as the exchange of information between subsystems. The system memory 446 and/or the fixed disk 434 may embody a CRM 220. Any of these elements may be present in the previously described features.

In some embodiments, an output device such as the printer 430 or display 230 of the Ti system 10 can output various forms of data. For example, the Ti system 10 can output 2D/3D HR color/monochromatic images, data associated with these images, or other data associated with analyses performed by the Ti system 10.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a CRM, such as a random access memory (RAM), a read only memory (ROM), a magnetic medium such as a hard-drive or a floppy disk, or an optical medium such as a CD-ROM. Any such CRM may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

All patents, patent applications, publications, and descriptions mentioned above are hereby incorporated by reference in their entirety for all purposes. None is admitted to be prior art.

What is claimed is:

1. A Talbot imaging device comprising:
    a Talbot element configured to repeat a Talbot image at a distance from the Talbot element; and
    a phase gradient generating device configured to scan the Talbot image by incrementally changing a phase gradient of a light field incident the Talbot element.

2. The Talbot imaging device of claim 1, wherein the distance is an integer multiple of a half Talbot distance.

3. The Talbot imaging device of claim 1, wherein the Talbot image is an array of focal spots.

4. The Talbot imaging device of claim 1, further comprising a light detector configured to capture time-varying light data associated with light altered by an object located at the distance from the Talbot element.

5. The Talbot imaging device of claim 4, further comprising a processor configured to construct an image of the object based on the time-varying light data.

6. The Talbot imaging device of claim 4, further comprising a collection element located between the Talbot element and the light detector, the collection element configured to pass emissions and reject excitation light to the light detector.

7. The Talbot imaging device of claim 4, wherein the phase gradient generating device scans the Talbot image in lateral directions of a plane at the distance by incrementally changing the phase gradient in two orthogonal directions.

8. The Talbot imaging device of claim 4, wherein the Talbot element comprises a two-dimensional array of apertures.

9. The Talbot imaging device of claim 1, wherein the phase gradient generating device comprises a liquid crystal beam deflector.

10. The Talbot imaging device of claim 1, wherein the phase gradient generating device comprises a MEMS mirror.

11. A Talbot imaging system comprising:
    a Talbot imaging device comprising
        a Talbot element configured to repeat a Talbot image at a distance from the Talbot element, and
        a phase gradient generating device configured to scan the Talbot image by incrementally changing a phase gradient of a light field incident the Talbot element, and
        a light detector configured to capture time-varying light data associated with light altered by an object located at the distance from the Talbot element; and
    a processor configured to construct an image of the object based on the time-varying light data.

12. The Talbot imaging system of claim 11, wherein the distance is an integer multiple of a half Talbot distance.

13. The Talbot imaging device of claim 11, wherein the Talbot image is an array of focal spots.

14. The Talbot imaging system of claim 11, further comprising a collection element located between the Talbot element and the light detector, the collection element configured to pass emissions and reject excitation light to the light detector.

15. The Talbot imaging device of claim 11, wherein the phase gradient generating device scans the Talbot image in lateral directions of a plane at the distance by incrementally changing the phase gradient in two orthogonal directions.

16. A method of imaging using a Talbot imaging system, the method comprising:
    incrementally changing a phase gradient of a light field incident a Talbot element to scan a Talbot image at a plane at a distance from the Talbot element;
    receives light altered by an object located at the plane;
    generating, by the light detector, time varying light data based on light received; and constructing an image of the object based on the time varying light data.

17. The method of claim 16, wherein the distance is an integer multiple of a half Talbot distance.

18. The method of claim 16, wherein the Talbot image is an array of focal spots.

19. The method of claim 16, wherein the Talbot image is scanned in two orthogonal directions of the plane.

20. The method of claim 16, further comprising filtering light to the light detector.

* * * * *